(12) United States Patent
Miyazaki

(10) Patent No.: US 6,704,504 B2
(45) Date of Patent: Mar. 9, 2004

(54) ZOOM LENS POSITION CONTROL DEVICE

(75) Inventor: Satoshi Miyazaki, Tokyo (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 10/100,306

(22) Filed: Mar. 18, 2002

(65) Prior Publication Data

US 2002/0146246 A1 Oct. 10, 2002

(30) Foreign Application Priority Data

Apr. 4, 2001 (JP) ........................................ 2001-105948

(51) Int. Cl.[7] .............................. G03B 17/00; G03B 3/10
(52) U.S. Cl. ............................ 396/79; 396/87; 396/133
(58) Field of Search .............................. 396/79, 85, 86, 396/87, 133

(56) References Cited

U.S. PATENT DOCUMENTS 5,784,653 A * 7/1998 Nomura et al. ............... 396/87

FOREIGN PATENT DOCUMENTS

JP          11-017792          1/1999

* cited by examiner

*Primary Examiner*—Russell Adams
*Assistant Examiner*—Arthur A Smith
(74) *Attorney, Agent, or Firm*—Straub & Pokotylo; John C. Pokotylo

(57) ABSTRACT

The present invention relates to a zoom lens position control device. An encoding pattern, which shows a shift between a focal length changing region and a focal point adjusting region by turns, is provided for a rotary frame in which a lens group of a step zoom lens capable of setting a plurality of focal lengths is arranged. Electrical conduction/non-conduction based on the pattern is detected as an ON/OFF state. The present position of the zoom lens is determined on the basis of the ON/OFF state. When the zoom lens is shifted from the stopping position due to the application of an external force, the stopping position of the zoom lens is initialized. The operation of the zoom lens is subsequently shifted to exposure in a focal length position, where the zoom lens is originally stopped, without unnecessarily increasing release time lag.

16 Claims, 17 Drawing Sheets

ZOOM LENS POSITION CONTROL DEVICE

CROSS-REFERENCE TO RELATED APPLICATIONS

This application is based upon and claims the benefit of priority from the prior Japanese Patent Application No. 2001-105948, filed Apr. 4, 2001, the entire contents of which are incorporated herein by reference.

BACKGROUND OF THE INVENTION

1. Field of the Invention

The present invention relates to a position control device of a power zoom lens of a camera.

2. Description of the Related Art

Generally, to realize a reduction in size and weight of a camera, sharing or simplifying a driving mechanism and a driving-source is being improved. The driving source is used for various applications such as film transport, driving (zooming and focusing) of a photographic lens, and the like through a switching mechanism mounting a single motor. As the above-mentioned driving mechanism, for example, a step zoom mechanism is known. In the step zoom mechanism, zooming is performed stepwise by a single motor, focal length is varied on the basis of the zooming, and after that, the operation is switched to focal point adjustment (focusing).

As the step zoom mechanism, for example, there is a mechanism disclosed in Jpn. Pat. Appln. KOKAI Publication No. 6-313834. A camera according thereto has a first propeller coupled to a shaft of a motor and a second propeller coupled to a shaft provided for one gear included in a gear train. When the motor is driven, the propellers are rotated in photo-interrupters disposed for the propellers, thereby generating pulse signals. On the basis of the pulse signals, a zoom lens barrel is driven and the focusing operation is controlled.

The step zoom mechanism uses a zoom lens frame in which zooming regions, where the focal length is changed, and focusing regions, where the focal point is adjusted, are alternately arranged stepwise. Accordingly, when the zoom lens frame cannot be stopped at a proper position in the zooming region at the lens driving time, there is a problem in that the accuracy of focusing performed thereafter is degraded.

Even when the zoom lens frame is stopped at the proper position at zoom stop time, the position of the lens frame may be shifted due to the application of an external force or the like. Similarly in this case, there is a problem in that the accuracy of focusing performed thereafter is degraded.

In Jpn. Pat. Appln. KOKAI Publication No. 6-313834 mentioned above, the signal generated by the rotation of the propeller provided for the middle portion of the gear train for driving the lens frame is used for control at the lens driving time. Accordingly, it is difficult to perform the correct position control due to an influence of backlash in the gear train. In this constitution, when an external force is applied to shift the position of the lens frame, focusing may be performed in the zooming region. Consequently, it is difficult to accurately perform the focusing control.

BRIEF SUMMARY OF THE INVENTION

A first object of the present invention is to provide a zoom lens position control device, wherein a position of a step zoom with high accuracy is detected with a simple constitution to correctly perform focal length shift and focal point adjustment. A second object of the present invention is to provide a zoom lens position control device, wherein when an external force is applied and the stopping position of a zoom lens is shifted, the operation can be subsequently switched to exposure from a correct focal length position, and focusing control with high accuracy can be performed with a simple constitution.

To accomplish the above objects, according to the invention, there is provided a zoom lens position control device including: a zoom lens having a plurality of zoom steps in which a plurality of steps each including a focal length changing region and a focal point adjusting region are continuously arranged; driving means for driving the zoom lens; switching means in which the ON/OFF state is changed due to a shift between the focal length changing region and the focal point adjusting region; detecting means for detecting the ON/OFF state of the switching means; and control means for stopping driving the zoom lens in accordance with the detection of a change in the state of the switching means through the detecting means. The zoom lens position control device further includes a memory which stores a position where the zoom lens is stopped. When the zoom lens is moved from the stopping position stored in the memory, the zoom lens is shifted to an initial position.

According to the present invention, there is provided a camera including: a step zoom driving mechanism in which regions, where a focal length is changed, and regions, where focal point adjustment is performed, are alternately arranged stepwise, and which moves a photographic lens so that the photographic lens is located in the regions by turns, the step zoom driving mechanism including (a) a movable lens frame, (b) a motor which drives the movable lens frame, and an encoder which detects a displacement state of the movable lens frame, the encoder generating different kinds of signals in the focal length changing region and the focal point adjusting region; and a controller which controls the motor on the basis of the output signal of the encoder to instruct the focal length changing operation and the focal point adjustment operation.

According to the zoom lens position control device with the constitution as mentioned above, when the stopping position of the zoom lens is shifted due to the application of an external force, the detecting means detects a change in the state of the switching means to initialize the stopping position of the zoom lens.

BRIEF DESCRIPTION OF THE SEVERAL VIEWS OF THE DRAWING

FIG. 13 is a flowchart for explaining a processing when a power battery for a camera according to the second embodiment is turned on;

DETAILED DESCRIPTION OF THE INVENTION

Embodiments of the present invention will now be described in detail with reference to the drawings.

Figure 1:
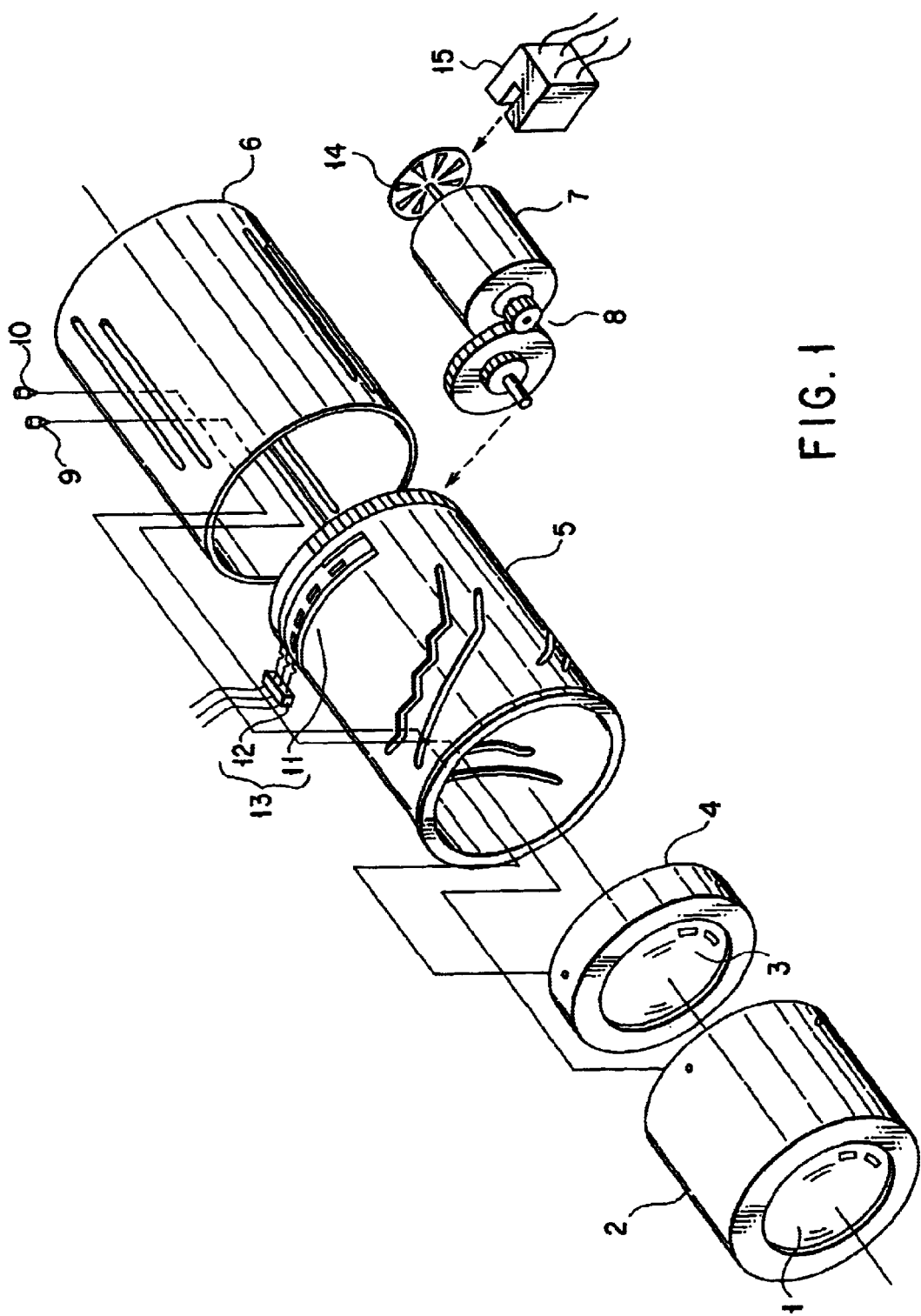
FIG. 1 is a diagram showing a constitutional example of a lens frame, which is mounted on a camera, as a first embodiment of a zoom lens position control device according to the present invention.

FIG. 1 shows the constitution of a lens frame of a photographic lens, which is mounted on a camera, as a first embodiment of a zoom lens position control device according to the present invention. The photographic lens has pluralities of lens groups which are movable along an optical axis in a constitution, which will be explained hereinbelow. The photographic lens is a zoom lens in which the focal length can be varied stepwise.

The lens frame of the zoom lens has a two-group constitution. That is, the lens frame primarily includes a first lens frame 2 which holds a first lens group 1 and a diaphragm and shutter mechanism 2a (refer to FIG. 2), a second lens frame 4 which holds a second lens group 3, a rotary frame 5 in which cams to define the amounts of delivery of the first lens frame 2 and the second lens frame 4 are formed, and a fixed frame 6 which is fixed to a camera body (not shown) and in which a plurality of straight grooves are formed. A motor 7 for driving the rotary frame 5 is provided for the lens frame through a gear train 8. The first lens frame 2, the second lens frame 4, the rotary frame 5, and the fixed frame 6 are coupled to each other through cam pins 9 and 10. In the coupling, the driving force of the motor 7 is transmitted to the rotary frame 5 from a pinion gear press-fitted to an output shaft through the gear train 8. The rotational movement of the rotary frame 5 is guided through the cam pins which move in the straight grooves to be changed to linear movements of the first lens frame 2 and the second lens frame 4 along the optical axis.

The zooming operation is performed by driving both of the first lens frame 2 and the second lens frame 4. The focusing operation is performed by driving the first lens frame 2 alone.

An encoder 13 for generating rotation positional information of the rotary frame 5 as an electric signal is provided on the outer periphery of the rotary frame 5. The encoder 13 comprises an encoder pattern 11 and a conductive brush 12. The encoder pattern 11 is composed of electrically conductive strips and electrically non-conductive strips. The strips are arranged side by side. The conductive brush is provided in sliding contact with the encoder pattern 11.

Moreover, a disk-shaped slit plate 14, in which a plurality of slits are formed, is press-fitted to the output shaft of the motor 7. A photo-interrupter (PI) 15 is disposed so as to hold the plate 14. The PI 15 generates rotational information of the motor 7 as an electric pulse signal.

Figure 2:
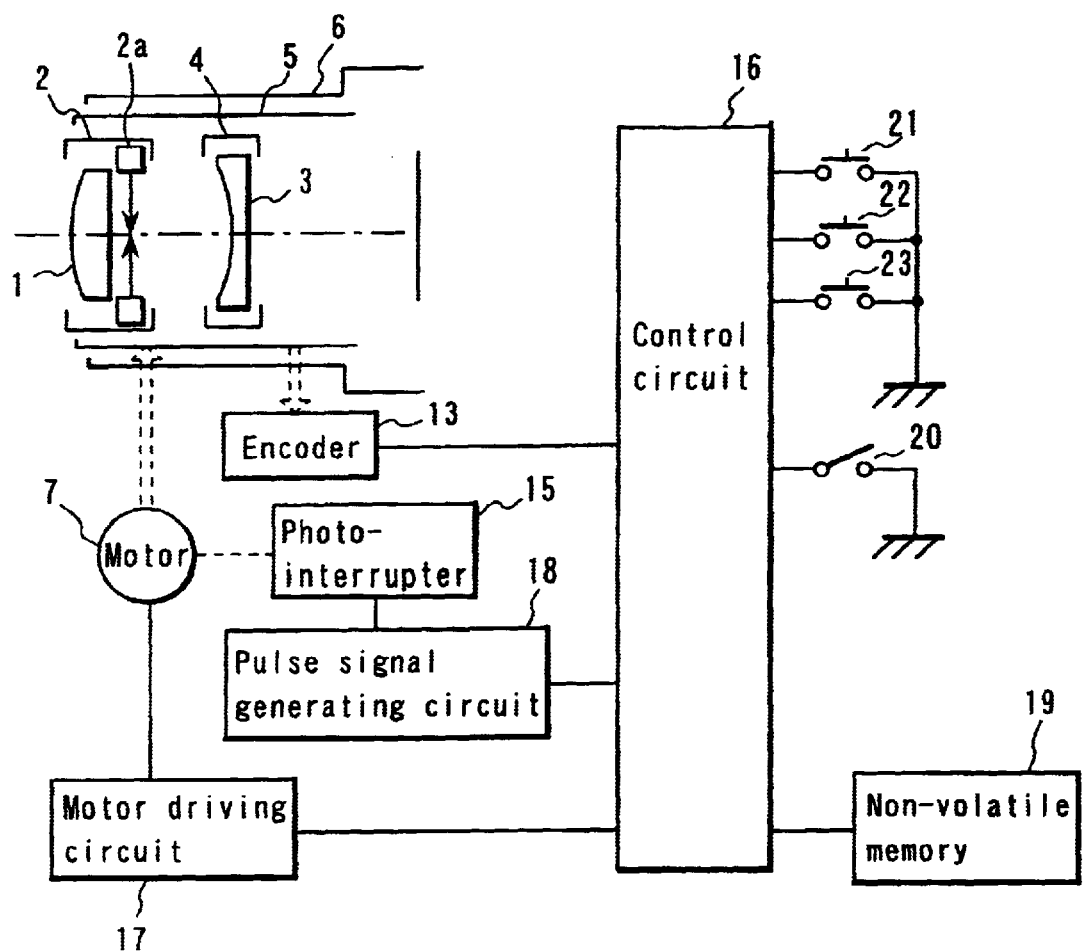
FIG. 2 is a diagram showing a constitutional example of the zoom lens position control device according to the first embodiment.

FIG. 2 is a diagram showing a constitutional example of the zoom lens position control device according to the first embodiment. In the diagram, the components required for the description regarding the outline of the present invention are extracted and shown.

The zoom lens position control device mounted on the camera includes a control circuit 16 for controlling the entire camera, a motor driving circuit 17 for driving the motor 7, a pulse signal generating circuit 18 for generating a pulse signal based on the output signal of the PI 15, the encoder 13 which is provided on the outer periphery of the rotary frame 5 and which generates rotational information of the rotary frame 5 to the control circuit 16, a non-volatile memory 19 comprising an electrically-rewritable EEPROM which stores data such as lens frame positional information, a power switch (PWSW) 20 for the camera, a release switch (RELSW) 21 for designating the start of exposure by operating a release button (not shown), a zoom-up switch (ZUSW) 22 for driving the zoom lens in the telephoto direction, and a zoom-down (zoom-back) switch (ZDSW) 23 for driving the zoom lens in the wide angle direction.

The components will now be specifically described.

The motor driving circuit 17 has an H-shaped bridge constituted of four transistors, rotates the motor 7 forward or reverse according to the instruction from the control circuit 16, and short-circuits the terminals of the bridge to realize braking. An output of the PI 15 is transmitted as a pulse signal whose waveform is shaped through the pulse signal generating circuit 18 to the control circuit 16. The control circuit 16 can detect the number of revolutions or the rotational speed of the motor 7, and the rotational angle or the rotational speed of the rotary frame 5 on the basis of the number of pulses of the pulse signals and the interval between the pulses. The control circuit 16 writes data such as positional information of each frame to the non-volatile memory 19 through a communication signal line and also reads out data when it is used.

Figure 3:
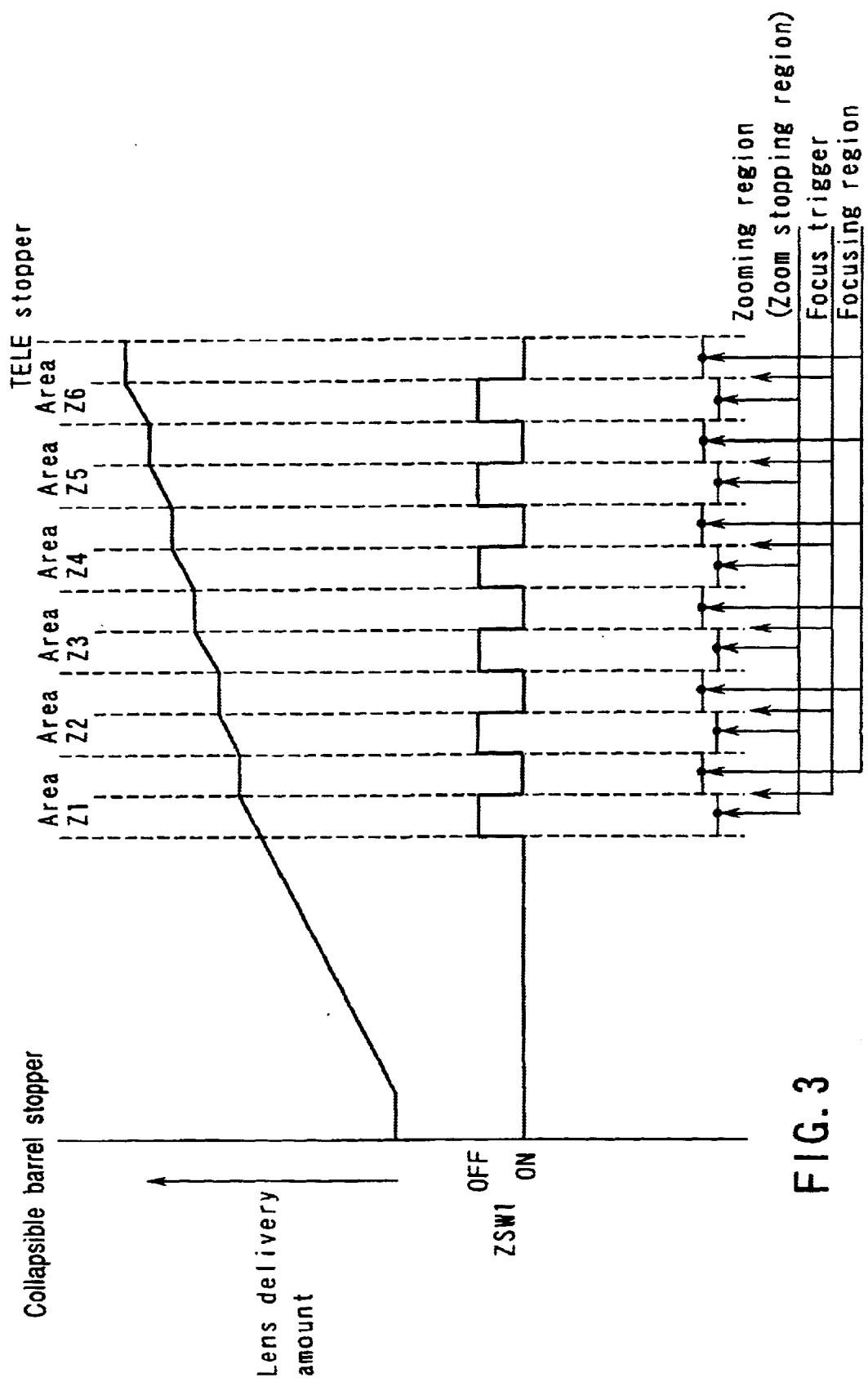
FIG. 3 is a graph showing a relation between rotation angle of a rotary frame and a pattern of an encoder.

FIG. 3 shows a relation between the lens delivery amount of the second lens group 4 followed by the rotation of the rotary frame 5 and an output pattern of the encoder 13.

The zoom lens in the present embodiment is a step zoom lens constructed in such a manner that a focal length changing region (zooming region) and a focal point adjusting region (focusing region) are repeated by turns. The lens has six zoom steps of areas Z1 to Z6. In the zoom lens, the first lens frame 2 and the second lens frame 4 can be moved between a photographing region and a collapsible barrel position, where lens barrels are received in the camera body. The left portion of the graph denotes the direction in which the lens is retracted to the collapsible barrel position and the right portion thereof denotes the direction in which the lens is delivered toward the telephoto end.

An output of the encoder 13 is shown as the ON/OFF state of switching means (ZSW1). The left end indicates a mechanical stopper position, with which the lens frames of the first lens frame 2 and the second lens frame 4 come into contact when they are further retracted over the collapsible barrel position, where the lens frames are received in the camera body. The right end denotes a mechanical stopper position with which the lens frames come into contact at the telephoto end. When the lens frames always come into contact with the components located at the mechanical stopper positions and are then stopped, loads are applied to the components and the motor. Accordingly, in some cases, the lens frames are electrically stopped before they reach the end.

The photographing region includes an area from a position, where the state of the ZSW1 is changed from the ON state to the OFF state after the lens is delivered from the collapsible barrel position, up to the telephoto end. In the photographing region, the focal length is changed in an area where the ZSW1 is in the OFF state, and the focal point is adjusted in an area where the ZSW1 is in the ON state. The zooming operation is controlled so that the lens is stopped in the area where the ZSW1 is in the OFF state. On the other hand, the focusing operation is controlled in the area where the ZSW1 is in the ON state on the basis of a point (focus trigger) at which the ZSW1 is switched from the OFF state to the ON state as a reference.

In this instance, the description is made on the assumption that the telephoto end is the same position as the stopper position on the telephoto side. The stopper position can be set to a position where the lens is further delivered over the telephoto end. The wide angle end denotes a position where the lens is delivered from the collapsible barrel position and is then slightly delivered over the position where the ZSW1 is changed from the ON state to the OFF state.

The zooming operation and the focusing operation will now be described.

Figure 4:
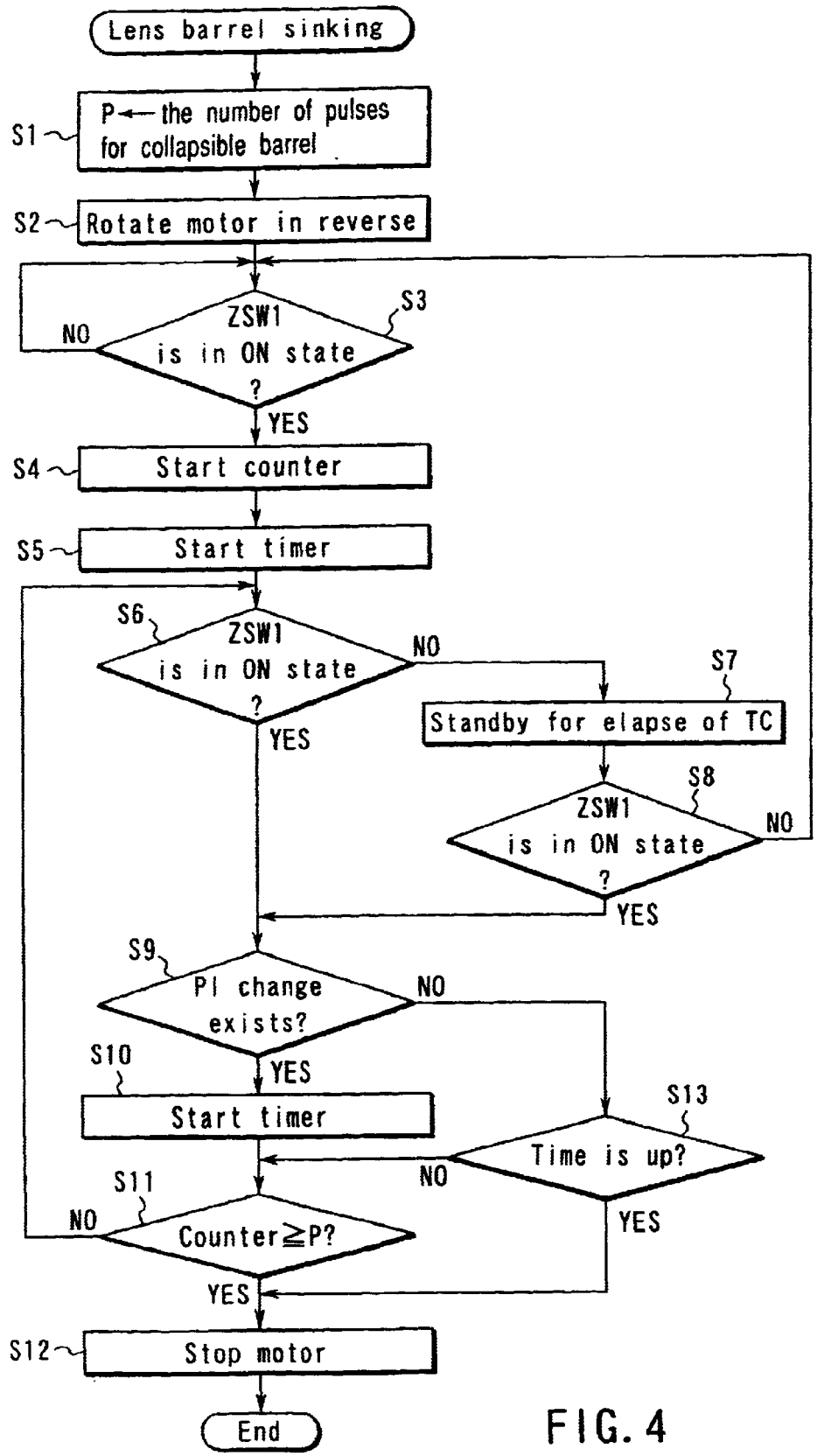
FIG. 4 is a flowchart for explaining a processing of a control circuit for controlling a collapsible barrel operation of the camera.

A processing of the control circuit 16 when the collapsible barrel operation in the camera is controlled will now be described with reference to a flowchart shown in FIG. 4.

First, the number of pulses for collapsible barrel is set to P. The number P is read out from the nonvolatile memory 19 and is then set to a table of an RAM in the control circuit 16 (step S1). The number of pulses for collapsible barrel denotes the number of pulses of the PI 15 generated for a period during which the rotary frame 5 is rotated from a point closest to the collapsible barrel position just before the collapsible barrel stopper among the points shown in FIG. 3 at which the ZSW1 is switched from the OFF state to the ON state. The number P has been previously stored in the non-volatile memory 19.

Subsequently, the motor 7 is driven in the reverse direction to start the retraction of the zoom lens (step S2). Whether ZSW1 is changed to the ON state is determined (step S3). In the determination, if it is in the OFF state, standby is held until the ZSW1 enters the ON state. When it is changed to the ON state (YES), a counter to count the pulse signals of the PI 15 (the number of PI pulses) is started (step S4). Subsequently, a timer to determine whether the rotary frame 5 is brought into contact with the collapsible barrel stopper is started (step S5). Since the normal collapsible barrel operation is started from the photographing region, the rotary frame 5 is not brought into contact with the collapsible barrel stopper. The processing is performed to cope with a case where the stopping position of the zoom lens is shifted due to external loads.

Whether ZSW1 is in the ON state is determined (step S6). In the determination, when bouncing ZSW1 is in the OFF state (NO), standby is held until time TC is elapsed (step S7). As time TC, time during which bouncing of ZSW1 can be absorbed is set. When the encoder 13 has such a constitution that the conductive brush 12 is slid on the encoding pattern 11 as in the present embodiment, even in the case where the conductive brush 12 is located on the conductive portion of the encoding pattern 11, the following case is assumed. That is, the conductive brush 12 bounds, so that the ON state is interrupted. Accordingly, to precisely determine the OFF state, it is necessary to confirm that the OFF state is held for a predetermined period or longer. Standby is held for the time TC for the above reason.

On the contrary, the change from the OFF state to the ON state can be immediately determined. The reason is that even when the conductive brush 12 is located in the non-conductive portion of the encoding pattern 11 and then bounds, the ON/OFF state is not changed.

The position control device according to the present embodiment is constructed in such a manner that the focal length is changed in the area where ZSW1 is in the OFF state and the focal point is adjusted in the area where ZSW1 is in the ON state. The reason is that the change from the ON state to the OFF state requires standby for the time TC but the change from the OFF state to the ON state can be intermediately determined. Consequently, the operation can be shifted to the focusing operation for short time and release time lag can be reduced.

When the debounce time is elapsed, whether ZSW1 enters the ON state is again determined (step S8). When the OFF state is determined in the determination, the processing routine is returned to step S3 and standby is held till the next ON state. On the other hand, when it is determined that the OFF state of ZSW1 is caused by bouncing, it is assumed that the ON state is continued (YES). Alternately, when ZSW1 is in the ON state in the foregoing step S6 (YES), whether a pulse of the PI 15 is generated is determined (step S9). In this instance, the case where the pulse of the PI 15 is generated means that the rotary frame 5 has not come into contact with the collapsible barrel stopper but the motor 7 continues to rotate.

Subsequently, similar to the foregoing step S5, the timer to determine the contact is again started (step S10). Whether the member of PI pulses counted by the counter provided in the control circuit 16 reaches the predetermined number of pulses P for collapsible barrel is determined (step S11). In the determination, when the counted number of PI pulses does not reach the number of pulses P for collapsible barrel (NO), the processing routine is returned to step S6. However, when the number of PI pulses reaches the number of pulses for collapsible barrel, namely, the rotary frame 5 reaches the collapsible barrel position (YES), the motor 7 is stopped (step S12) and the collapsible barrel operation is finished.

When a pulse is not generated from the PI 15 in step S9 (NO), whether the predetermined period is elapsed and time is up is determined by the timer to determine the contact (step S13). In this instance, when the PI pulse is not generated but time is up (YES), it is determined that the rotary frame 5 has come into contact with the collapsible barrel stopper. The processing routine is shifted to step S12, thereby finishing the collapsible barrel operation. On the other hand, when time is not up (NO), the processing routine is shifted to step S11.

Subsequently, a processing of the delivery operation of the zoom lens to the wide angle end will now be described with reference to a flowchart shown in FIG. 5. According to the processing, PWSW 20 is turned on, thereby delivering the zoom lens from the collapsible barrel position to the wide angle end in order to prepare the photographing operation of the camera.

First, the motor 7 is driven in the forward direction to start the delivery of the zoom lens (step S21). Whether ZSW1 is in the OFF state is determined (step S22). In the determination, if ZSW1 is in the ON state (NO), standby is held until ZSW1 enters the OFF state. When it is in the OFF state (YES), standby is held until the time TC is elapsed (step S23). When the debounce time is elapsed, whether ZSW1 is in the OFF state is again determined (step S24). The time TC in step S23 is the same as that in step S7 in FIG. 4 mentioned above.

In the determination in step S24, when it is in the ON state (NO), the processing routine is returned to step S22. When ZSW1 is in the OFF state (YES), the number of added and transmitted pulses is set to P and is then set to a table of the RAM in the control circuit 16. In this instance, the number of added and transmitted pulses is slightly smaller than the number of PI pulses generated for a period during which the rotary frame 5 is rotated in the area where ZSW1 is in the OFF state. "Slightly" means a value obtained by expecting the amount of rotation of the rotary frame 5 for a period of delay time to detect a change from the ON state to the OFF state of ZSW1 and the amount of overrun of the rotary frame 5 after the motor 7 is stopped until the rotary frame 5 is stopped, and further adding an allowance to the amounts. The number of added and transmitted pulses has been previously stored in the non-volatile memory 19. In other words, after it is determined that ZSW1 is in the OFF state until the number of pulses reaches the number of added and transmitted pulses, when the rotary frame 5 is further rotated, the motor 7 is stopped, so that the rotary frame 5 can be stopped at a position in the area where ZSW1 is in the OFF state, the position being close to the telephoto end. The number of added and transmitted pulses is adjusted, so that the stopping position can be controlled.

Subsequently, the counter to count the number of PI pulses is started (step S26). Whether the counted number of PI pulses reaches the predetermined number of added and transmitted pulses P is determined (step S27). In the determination, when the number of PI pulses does not reach the number of added and transmitted pulses P (NO), the counting operation is continued until the number of PI pulses reaches the number P. When the number of PI pulses reaches the number P (YES), the motor 7 is stopped (step S28). The stopping position denotes the wide angle end. Then, the fact that the zoom position is in the area Z1 is set to the table of the RAM in the control circuit 16 (step S29). Similarly, the position is stored to the non-volatile memory 19 (step S30) and the processing is then finished.

A modification of the sequence in FIG. 5 will now be described with reference to FIG. 6. In the description regarding the modification, the same step reference numerals denote the same steps as those in the sequence explained in FIG. 5 to simplify the explanation.

First, the motor 7 is rotated forward to deliver the zoom lens. In a case where ZSW1 enters the OFF state, after the time TC is elapsed, whether ZSW1 is in the OFF state is again determined (steps S21 to S24). When ZSW1 is in the OFF state (YES), standby is held while the timer counts for, for example, 50 ms (step S31). After that, the motor 7 is stopped and the fact that the zoom position is in the area Z1 is stored to both of the table of the RAM in the control circuit 16 and the non-volatile memory 19, and the processing is finished (steps S28 to S30). The foregoing embodiment has been explained with respect to the case where the motor was rotated extra as much as the number of added and transmitted pulses P to control the stopping position on the basis of the position of ZSW1. As in the modification, the timer is used to insert time lag after the OFF state of ZSW1 is detected and determined until the motor 7 is stopped, so that the operation can be easily realized. The similar advantage can be derived.

Figure 7:
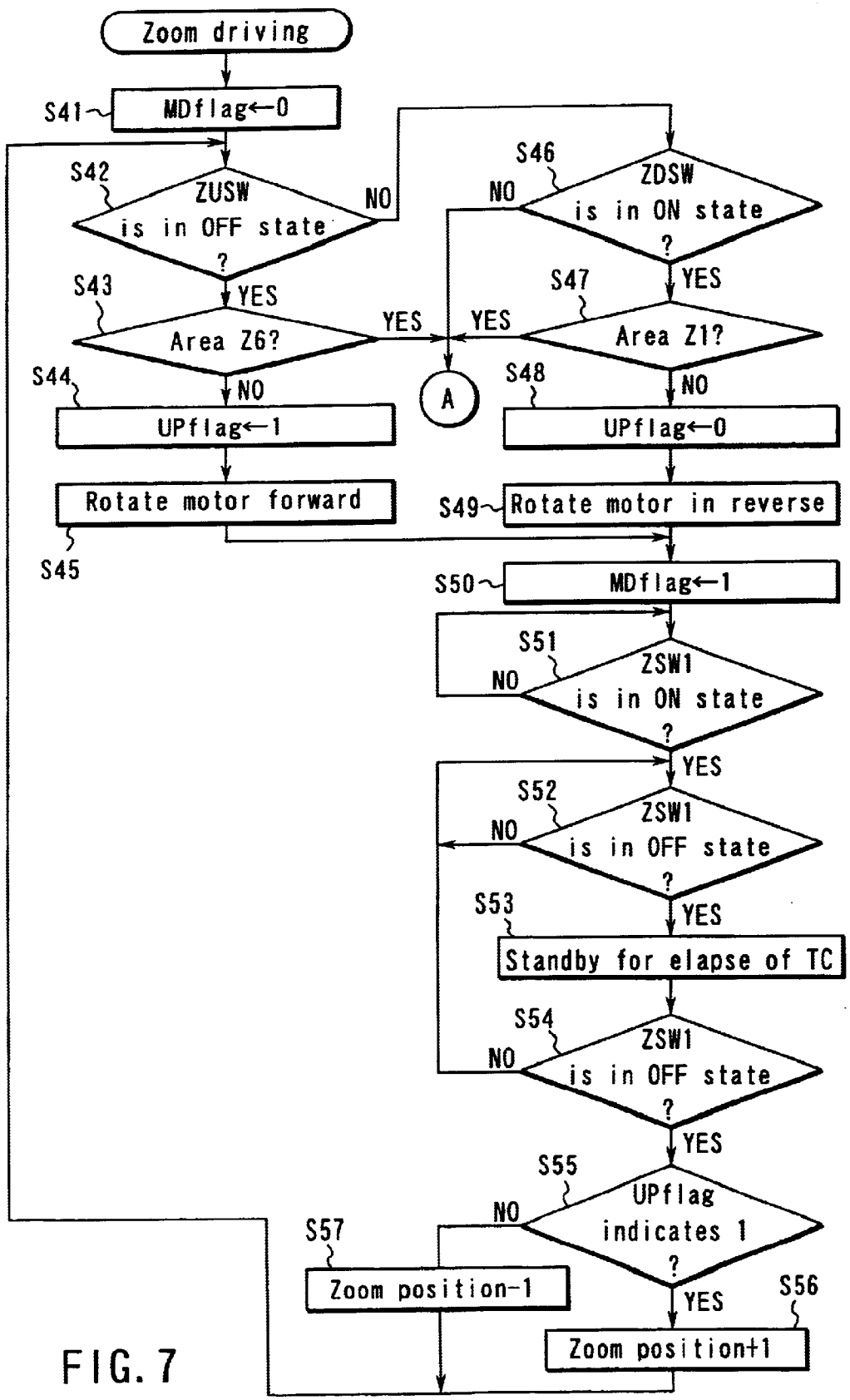
FIG. 7 is the former half portion of a flowchart for explaining a processing of the zooming operation of the zoom lens.
Figure 8:
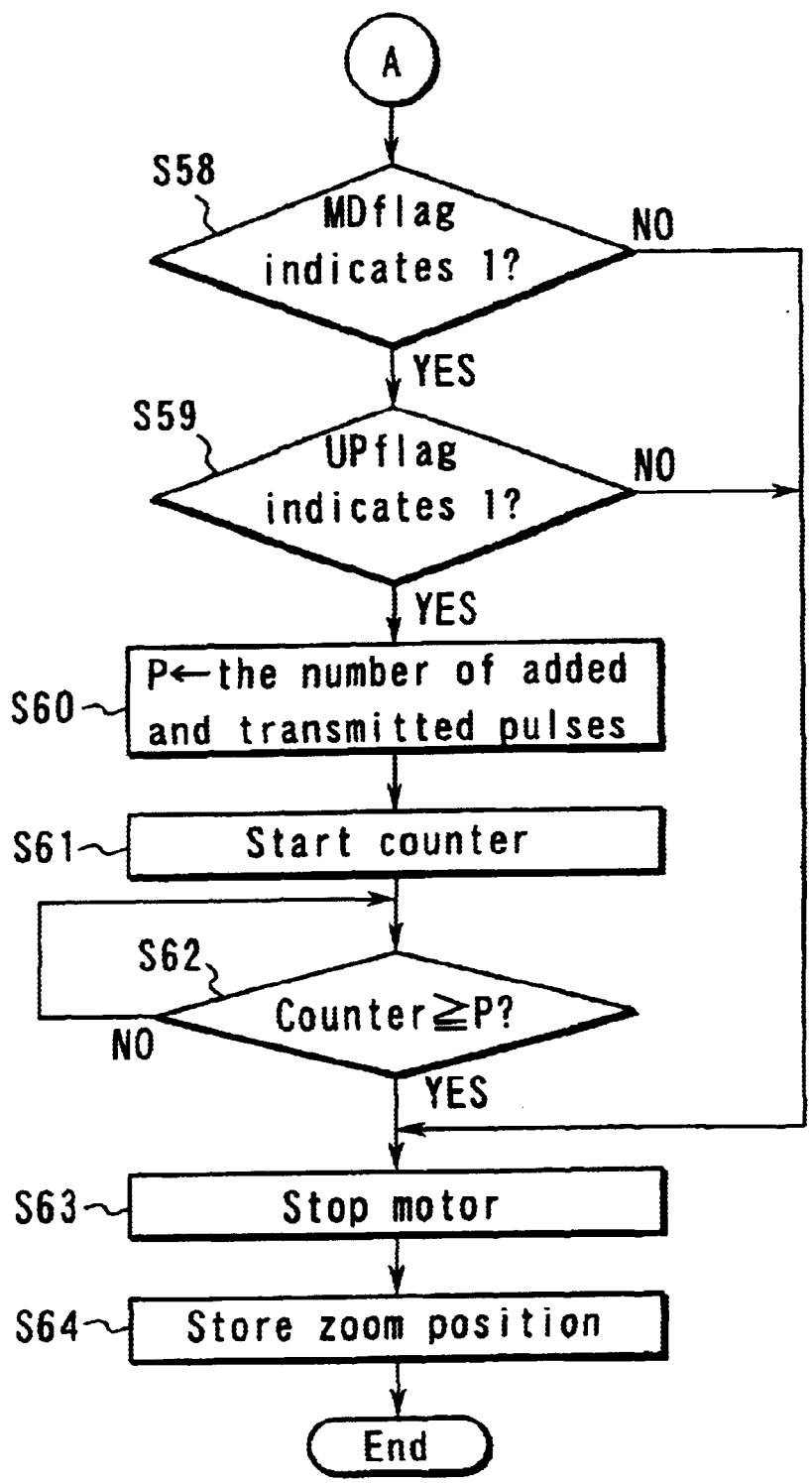
FIG. 8 is the latter half portion of the flowchart for explaining the processing of the zooming operation of the zoom lens, the flowchart following FIG. 7.

Subsequently, a processing of the zooming operation of the zoom lens position control device will now be described with reference to flowcharts shown in FIGS. 7 and 8. The zooming operation is performed as follows. While ZUSW 22 is operated, the zoom lens is delivered to the telephoto end (area Z6) and, while ZDSW 23 is operated, the zoom lens is retracted to the wide angle end (area Z1).

First, an MD flag indicating that the motor 7 is being driven is cleared (step S41). Whether ZUSW 22 is in the ON state is determined (step S42). In the determination, if ZUSW 22 is in the ON state (YES), whether the zoom lens reaches the telephoto end (area Z6) is determined (step S43). In this instance, in a case where the zoom lens has already reached the telephoto end (YES), the processing routine is shifted to the end processing after step S58, which will be described below. On the other hand, when the zoom lens does not reach the telephoto end (NO), an UP flag set in the RAM in the control circuit 16 is set to "1" (step S44). That is, the fact that the zooming-up operation is being performed is stored. The motor 7 is then driven forward to start the delivery of the zoom lens (step S45). After that, the processing routine is shifted to step S50, which will be explained below.

In the determination in the foregoing step S42, when ZUSW 22 is in the OFF state (NO), whether ZDSW 23 is in the ON state is determined (step S46). In the determination, when ZDSW 23 is in the OFF state (NO), the processing routine is shifted to step S58, which will be described hereinbelow. On the other hand, when it is in the ON state (YES), whether the zoom lens has already reached the wide angle end (area Z1) is determined (step S47). In the determination, when it is determined that the zoom lens has reached the wide angle end (YES), the processing routine is shifted to step S58, which will be described hereinbelow. On the other hand, when it does not reach the wide angle end (NO), the UP flag set in the RAM is cleared (step S48). The reason is that the fact that the zoom-back operation is being performed is stored. The motor 7 is then driven reverse to start the retraction of the zoom lens (step S49).

Subsequently, "1" is set to the MD flag indicating that the motor 7 is being driven (step S50). Whether ZSW1 enters the ON state is determined (step S51). In the determination, it is determined that the zoom lens is moved from a zoom stopping region (in the present embodiment, it is the same as the zooming region) to the focusing region as the focal point adjusting region. When ZSW1 is in the OFF state (NO), standby is held until ZSW1 enters the ON state. However, when it is in the ON state (YES), whether ZSW1 is in the OFF state is determined (step S52). In other words, whether the zoom lens reaches the next zoom stopping region is determined in this step. In this instance, when ZSW1 is in the OFF state (YES), standby is held until the time TC is elapsed (step S53). After that, whether ZSW1 is in the OFF state is again determined (step S54). In this instance, when ZSW1 is in the ON state (NO), the processing routine is returned to step S52 and the same processing is again repeated. On the other hand, when ZSW1 is in the OFF state (YES), whether "1" is set in the UP flag is determined (step S55). In this determination, when "1" is set in the UP flag (YES), it means that the zoom lens is being in the zoom-up operation. Zoom positional information set in the RAM is updated on the telephoto side by one step (step S56) and the processing routine is then returned to step S42. On the other hand, when the UP flag is set to "0" (NO), it means that the zoom lens is being in the zoom-back operation. The zoom positional information set in the RAM is updated on the wide angle side by one step (step S57) and the processing routine is returned to step S42.

Subsequently, when the zoom lens reaches the telephoto end in the foregoing step S43, when the zoom lens reaches the wide angle end in the foregoing step S47, or when the operation for a zoom lever is finished in the foregoing step S46, whether "1" is set in the MD flag, namely, whether the motor 7 for performing the stop processing is being driven is determined (step S58). In the determination, when the MD flag indicates "1" (YES), the motor 7 is being driven. Whether "1" is set in the UP flag is determined (step S59) is determined, thereby determining the driving direction. On the other hand, when the flag denotes "0" in steps S58 and S59, the processing routine is shifted to step S63, which will be described hereinbelow. However, when "1" is set in the UP flag in step S59 (YES), the predetermined number of added and transmitted pulses is set to P (step S60). The number of added and transmitted pulses is similar to that in step S25 in FIG. 5.

Subsequently, the counter is started to start to count the number of PI pulses (step S61). Whether the counted number of PI pulses reaches the number of added and transmitted pulses P is determined (step S62). In the determination, when the number of PI pulses does not reach the number of added and transmitted pulses P (NO), the counting operation is continued until the number of PI pulses reaches the number P. When it reaches the number P (YES), it is determined that the rotary frame reaches a position where the rotary frame should be stopped, the motor 7 is then stopped (step S63), and zoom positional information is stored to the non-volatile memory 19 (step S64).

According to the above-mentioned processing, the rotary frame can be stopped at substantially the same position on the telephoto side (close to the focal point adjusting region) in the area where ZSW1 is in the OFF state irrespective of the driving direction for zoom-up or zoom-back.

Figure 9:
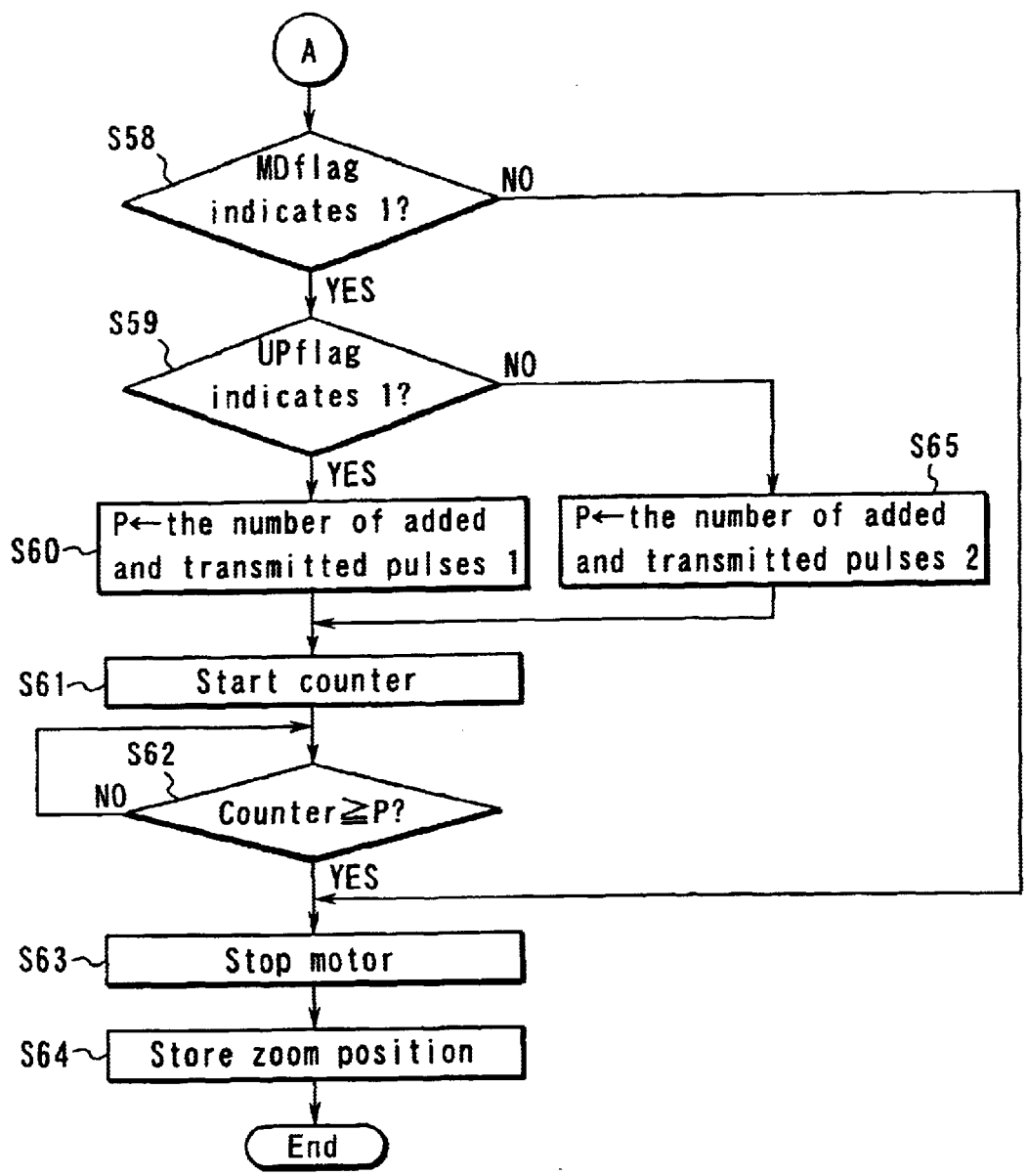
FIG. 9 is a flowchart for explaining the modification of the zooming operation of the zoom lens.

As a modification of the processing of the zooming operation in FIGS. 7 and 8, a modification of the latter half sequence in FIG. 8 will now be described with reference to FIG. 9. In the description regarding the modification, since the former half sequence (steps S41 to S57) is entirely the same as the flowchart shown in FIG. 7, the description is omitted. The same step reference numerals designate the same step contents as those in the latter half sequence (steps S58 to S64) shown in FIG. 8 to simplify the description.

In the case where the rotary frame reaches the telephoto end in the foregoing step S43 in the former half sequence, the case where the zoom lens reaches the wide angle end in the foregoing step S47, or the case where the operation for the zoom lever is finished in the foregoing step S46, when "1" is set in the MD flag, it is determined that the motor 7 is being driven. The driving direction is determined on the basis of the UP flag (steps S58 and S59). In the foregoing step S58, when "0" is set to the MD flag (NO), the processing routine is shifted to step S63, which will be described hereinbelow. In the foregoing step S59, when "1" is set in the UP flag (YES), the number of added and transmitted pulses 1 is set to P (step S60). The number of added and transmitted pulses 1 is similar to that in step S25 in FIG. 5. On the other hand, when "0" is set to the UP flag (NO), the number of added and transmitted pulses 2 is set to P (step S65).

The number of added and transmitted pulses 2 denotes the number of pulses to stop the lens at a predetermined position close to the telephoto end in the area Z1 where ZSW1 is in the OFF state when the driving direction denotes the zoom-back operation.

When the numbers of the added and transmitted pulses P are set, the counter is started to start to count the number of PI pulses. Whether the number of PI pulses reaches the number of added and transmitted pulses P is determined (step S62). In the determination, when the number of PI pulses does not reach the number of added and transmitted pulses P (NO), the counting operation is continued until the number of PI pulses reaches the number P. When it reaches the number P (YES), it is determined that the zoom lens reaches a position where the lens should be stopped, the motor 7 is stopped (step S63), and zoom positional information is stored to the non-volatile memory 19 (step S64).

In the modification, more or less pulses are used in the zoom-back operation than in the zoom-up operation, but the lens is stopped by the same method in both the zoom-back operation and the zoom-up operation. As mentioned above, when the different numbers of added and transmitted pulses 1 and 2 are set, the stopping position can be freely controlled. Accordingly, the zoom lens can be surely stopped at a target position (where ZSW1 is in the OFF state and which is close to the focusing region).

A processing (release processing) of the exposure operation of the camera will now be described with reference to a flowchart shown in FIG. 10.

First, whether ZSW1 in an initial state is in the OFF state is determined (step S71). Essentially, at exposure start time, ZSW1 has to be in the OFF state. When it is in the ON state (NO), it is considered that the position of the zoom lens is shifted from a predetermined position (zooming region) due to some external force. When the exposure operation is performed in the above state, there is a high possibility that the accuracy of the focusing control may not be guaranteed. Accordingly, the lens position is once initialized (step S82).

Figures 5, 6:
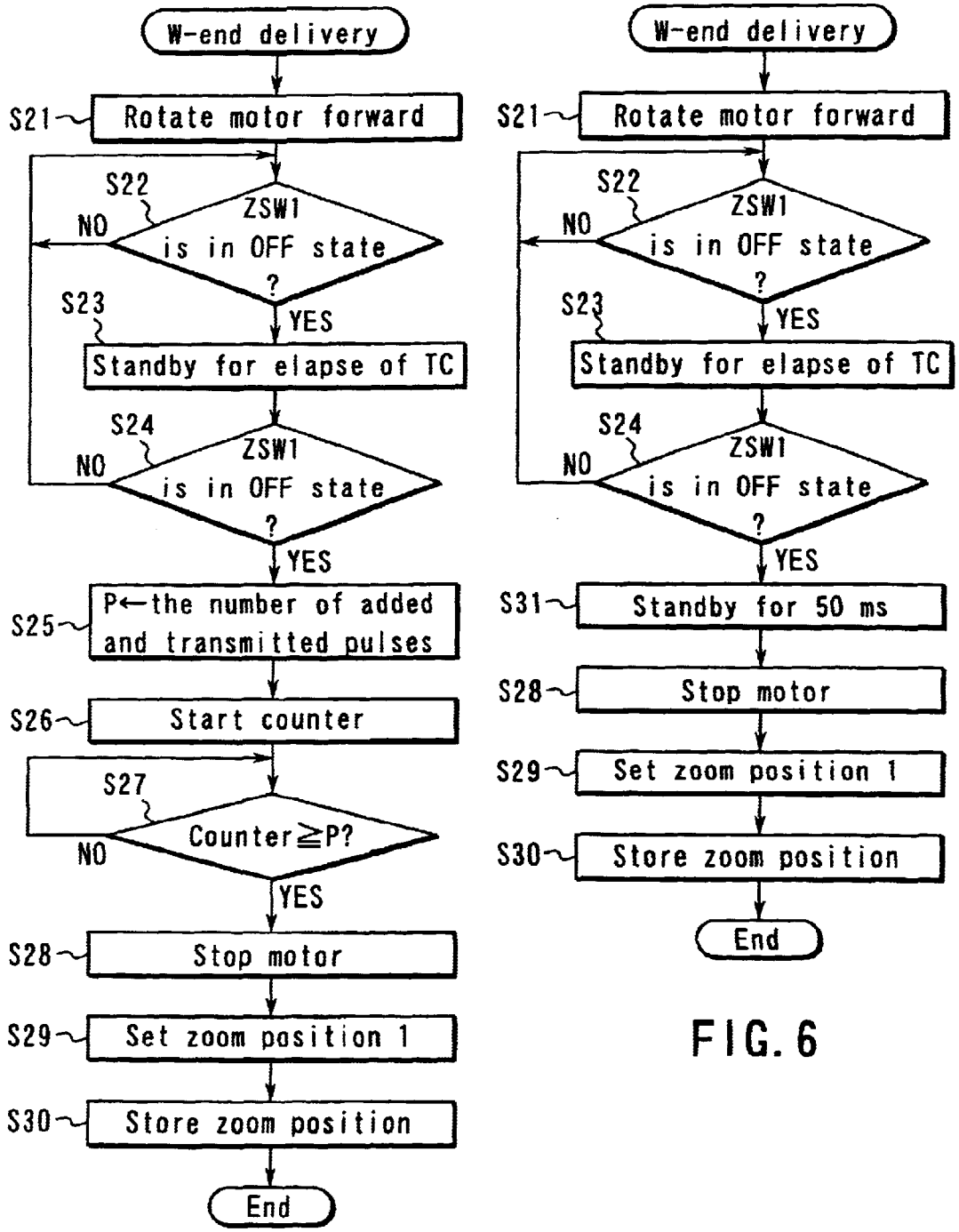
FIG. 5 is a flowchart for explaining the wide-end delivery operation of the zoom lens.
FIG. 6 is a flowchart showing a modification of the sequence in FIG. 5.

After the collapsible barrel operation (refer to FIG. 4) of the zoom lens is performed, the initialization is performed by the delivery operation to the wide end (refer to FIG. 5 or 6). That is, when it is considered that the position of the zoom lens is varied, the collapsible barrel operation is performed to temporarily retract the rotary frame 5 to the collapsible barrel position and, after that, deliver the rotary frame 5, thereby stopping the zoom lens at a position in the zooming region in the area Z1, the position being close to the focusing region.

On the other hand, when ZSW1 is in the OFF state (YES), the driving operation is started so as to rotate the motor 7 forward (step S72).

Whether ZSW1 is in the ON state is determined (step S73). In the determination, since switching from the OFF state to the ON state can be immediately determined, the switching point is used as a reference (focus trigger) of the focal point adjustment requiring the accuracy. In the determination, when ZSW1 is in the OFF state (NO), the motor driving operation is continued. When ZSW1 is in the ON state (YES), the operation to count the number of PI pulses is started as mentioned above (step S74). Whether the counted number of PI pulses reaches the number of added and transmitted pulses P is determined (step S75). In this instance, reference symbol P denotes a value, which has been calculated previously, obtained as the number of PI pulses corresponding to the amount of delivery of the lens in order to focus an object on the basis of a distance-measuring result from a distance-measuring unit (not shown). In the determination, when the number of PI pulses does not reach the number of added and transmitted pulses P (NO), the counting operation is continued until it reaches the number P. When it reaches the number P (YES), it is determined that the zoom lens reaches a position where the lens should be stopped and the motor 7 is then stopped (step S76).

The foregoing steps S74 to S76 denote the focusing operation to perform the focal point adjustment of the photographic lens. Accordingly, in the above flowchart, prior to the focal point adjustment, the state of ZSW1 is detected in step S71. As the result of detection, when a signal from the encoder is not a predetermined signal, the lens position is initialized in step S82. Accordingly, the focus trigger can be surely detected before the focusing operation.

Subsequently, a film loaded in the camera is exposed (step S77). In order to retract the zoom lens to the initial position after the exposure, the driving operation is started so that the motor 7 is rotated backward (step S78). Whether ZSW1 is in the OFF state is then determined (step S79). That is, whether the zoom lens reaches the zoom stopping region before photographing is determined. In this instance, when ZSW1 it is in the OFF state (YES), standby is held until the time TC is elapsed (step S80), and after that, whether ZSW1 is in the OFF state is gain determined (step S81). In this instance, when ZSW1 is in the ON state (NO), the processing routine is returned to step S79 and the same processing is again repeated. On the other hand, when ZSW1 is in the OFF state (YES), it is determined that the zoom lens reaches the zoom stopping region before photographing and the motor 7 is then stopped (step S83).

According to the first embodiment described above, the following advantages can be obtained.

First, the single encoding pattern can control the step zoom lens, in which a plurality of focal lengths can be set. Second, the output of the zoom encoder can be used as the focal point adjustment reference with high accuracy. Third, even when the lens position is shifted due to an external force, an out-of-focus picture is not taken. Fourth, since the lens can be stopped at substantially the same position irrespective of the driving direction for zoom-up or zoom-back, a camera having a finder lens, which can vary a focal length in synchronization with the zooming operation of a photographic lens, can suppress variations of a finder image obtained when the lens is stopped in the same zooming region. Fifth, since the zoom stopping region is limited narrowly, a lens entrance region upon photographing can be set to a short region, so that release time lag can be reduced. Sixth, the reverse driving operation for backlash is not needed irrespective of the zoom driving direction, so that natural motion is derived.

Figure 11:
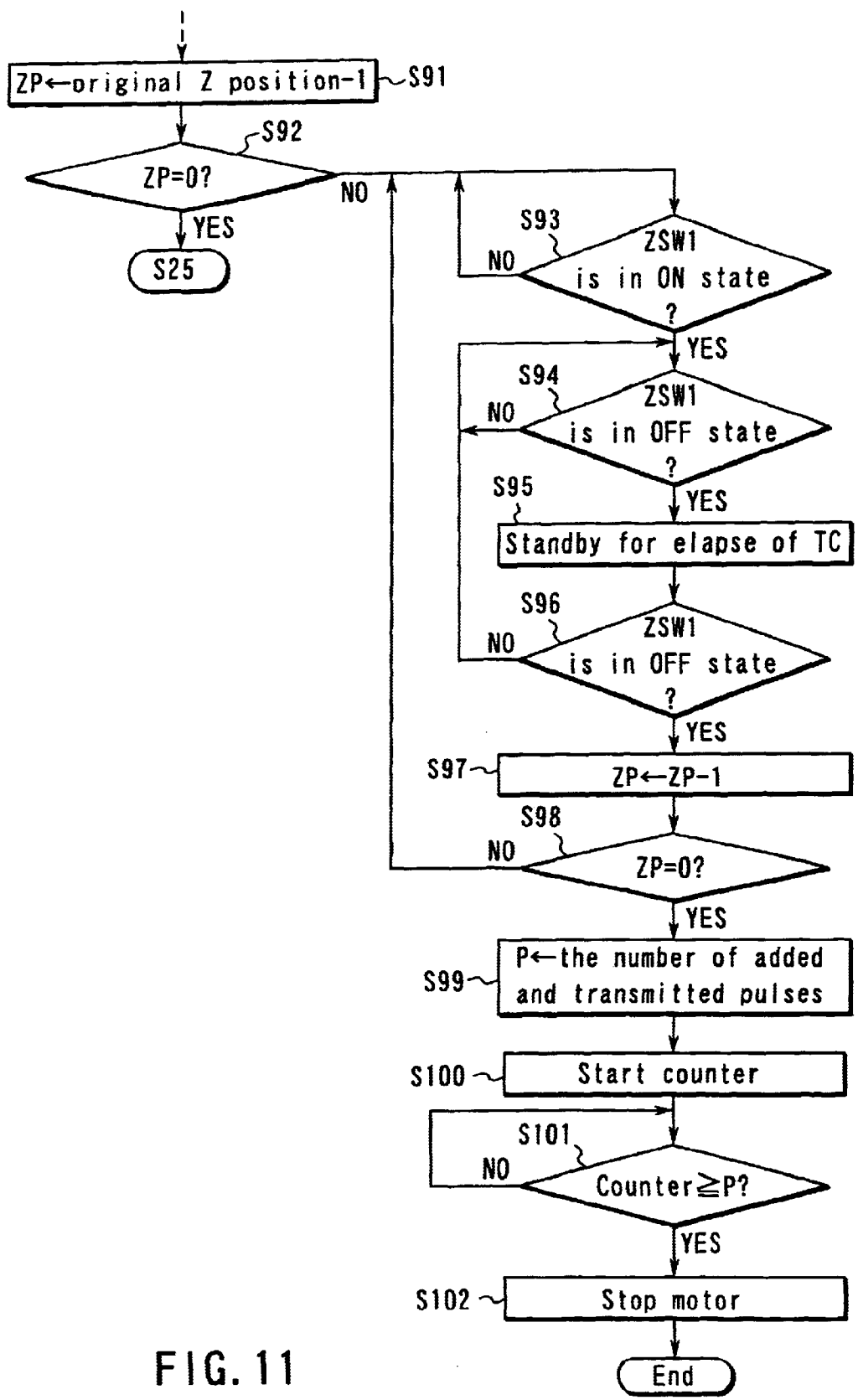
FIG. 11 is a flowchart for explaining a modification of the first embodiment.

Subsequently, a modification of the first embodiment will now be described with reference to a flowchart shown in FIG. 11.

Figure 10:
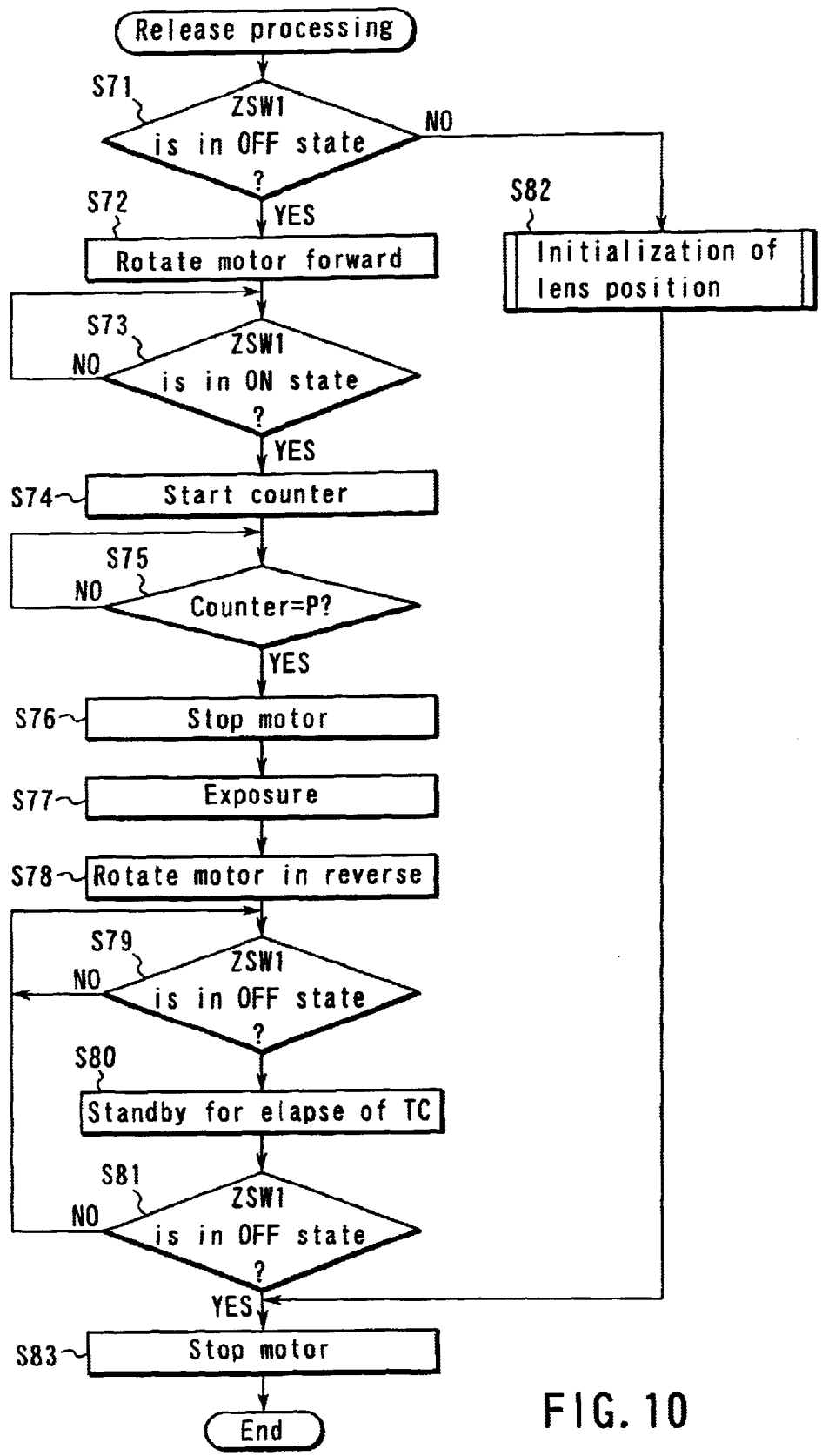
FIG. 10 is a flowchart for explaining a processing of the exposure operation of the camera.

The initialization (step S82) of the lens position in the case where ZSW1 is in the ON state at the exposure start time described in FIG. 10 in the foregoing first embodiment includes the collapsible barrel operation to the collapsible barrel position and the wide-end delivery operation performed thereafter. In addition, in the initialization, the zoom lens can be delivered to the zoom position where the lens is originally stopped. The delivery operation of the zoom lens in the modification is executed without stopping the motor after the processings explained in step S24 in FIG. 5 and step S31 in FIG. 6.

First, a value obtained by subtracting "1" from the zoom positional information regarding the position, where the lens is originally stopped, stored in the non-volatile memory 19 is set to ZP (step S91). Subsequently, whether the value ZP is equal to "0" is determined (step S92). When the value is equal to "0" (YES), it means that the original zoom position is located at the wide angle end (area Z1). Accordingly, the processing after step S25 shown in FIG. 5 is continued to stop the zoom lens at the wide angle end. On the other hand, when the value ZP denotes a value other than "0" (NO), whether ZSW1 is in the ON state (the lens is shifted from the zoom stopping region to the focal point adjusting region) is determined (step S93). When ZSW1 is in the OFF state (NO), standby is held as it is. When it is in the ON state (YES), whether ZSW1 is in the OFF state is determined (step S94). That is, whether the zoom lens reaches the next zoom stopping region is determined. In this instance, when ZSW1 is in the OFF state (YES), standby is held until the time TC is elapsed (step S95). After that, whether ZSW1 is in the OFF state is again determined (step S96). In this instance, when ZSW1 is in the ON state (NO), the processing routine is returned to step S94 and the same processing is again repeated. On the other hand, when ZSW1 is in the OFF state (YES), it is determined that the zoom lens reaches the next zoom stopping region and "1" is subtracted from the value ZP (step S97).

Next, whether the value ZP is equal to "0" is determined (step S98). When the value denotes a value other than "0" (the zoom lens reaches the original position) (NO), the processing routine is returned to step S93 and the processing is continued. However, when the value ZP is equal to "0" (the lens reaches the original position) (YES), the number of added and transmitted pulses is set to P (step S99). In this instance, the number of added and transmitted pulses is the same as that in step S25 in FIG. 5. Subsequently, the counter for counting the number of PI pulses is started (step S100). Whether the counted number of PI pulses reaches the predetermined number of added and transmitted pulses is determined (step S101). In the determination, when the number of PI pulses does not reach the number of added and transmitted pulses P (NO), the counting operation is continued until the number reaches the number P. When the number reaches the number P (YES), the motor 7 is stopped (step S102). Further, after the initialization operation of the lens position, the operation can be shifted to the exposure operation as it is. In this instance, after it is determined that the value ZP is equal to "0" in steps S92 and S98, the processing after step S72 in FIG. 10 may be executed.

According to the above modification, even when the zoom position of the zoom lens is shifted due to an external force, it is possible to prevent the camera from taking an out-of-focus picture. In addition, the operation can be continuously shifted to the exposure processing in the focal length position where the lens is originally stopped.

When the lens position is initialized and, after that, the exposure operation is not performed, the user may be confused. Accordingly, a warning can be given by using, for example, a display portion or a sound generating portion provided in a finder. On the other hand, when the exposure operation is continuously performed, in order to further reduce time required before the exposure, namely, release time lag, the lens position can also be initialized at timing that is different from and earlier than the release operation. For example, an input of ZSW1 to the control circuit of ZSW1 is allocated to a port in which an interruption processing can be performed. When a change in the state of ZSW1 is detected in the operation other than the zooming or focusing operation, it is determined that an external force is applied to the lens frame, so that the initialization operation of the lens position can be immediately executed.

For example, each time an operation member such as a zoom lever other than the release button is operated, the state of ZSW1 is detected. When it is determined that the lens position may be changed, the initialization operation of the lens position can be performed.

As mentioned above, according to the present embodiment, even when the zoom position of the zoom lens is moved by an external force, the lens position is initialized at the appropriate time. Accordingly, there is no case where release time lag is increased unnecessarily. The operation can be subsequently shifted to the exposure operation at the focal length position where the lens is originally stopped.

Subsequently, a position control device according to a second embodiment will now be described.

According to the foregoing first embodiment, the initialization of the lens position includes the collapsible barrel operation to the collapsible barrel position, the wide-end delivery performed thereafter, or, in addition, the delivery to the zoom position where the lens is originally stopped. In both the cases, since the collapsible barrel operation to the collapsible barrel position is performed, release time lag is caused for the operation. According to the second embodiment, in the initialization of the lens position, the collapsible barrel operation to the collapsible barrel position is not performed, the lens is retracted to a position where the lens is slightly moved from the wide end in the direction toward the collapsible barrel position. After that, the lens is delivered to the wide end.

Figure 12:
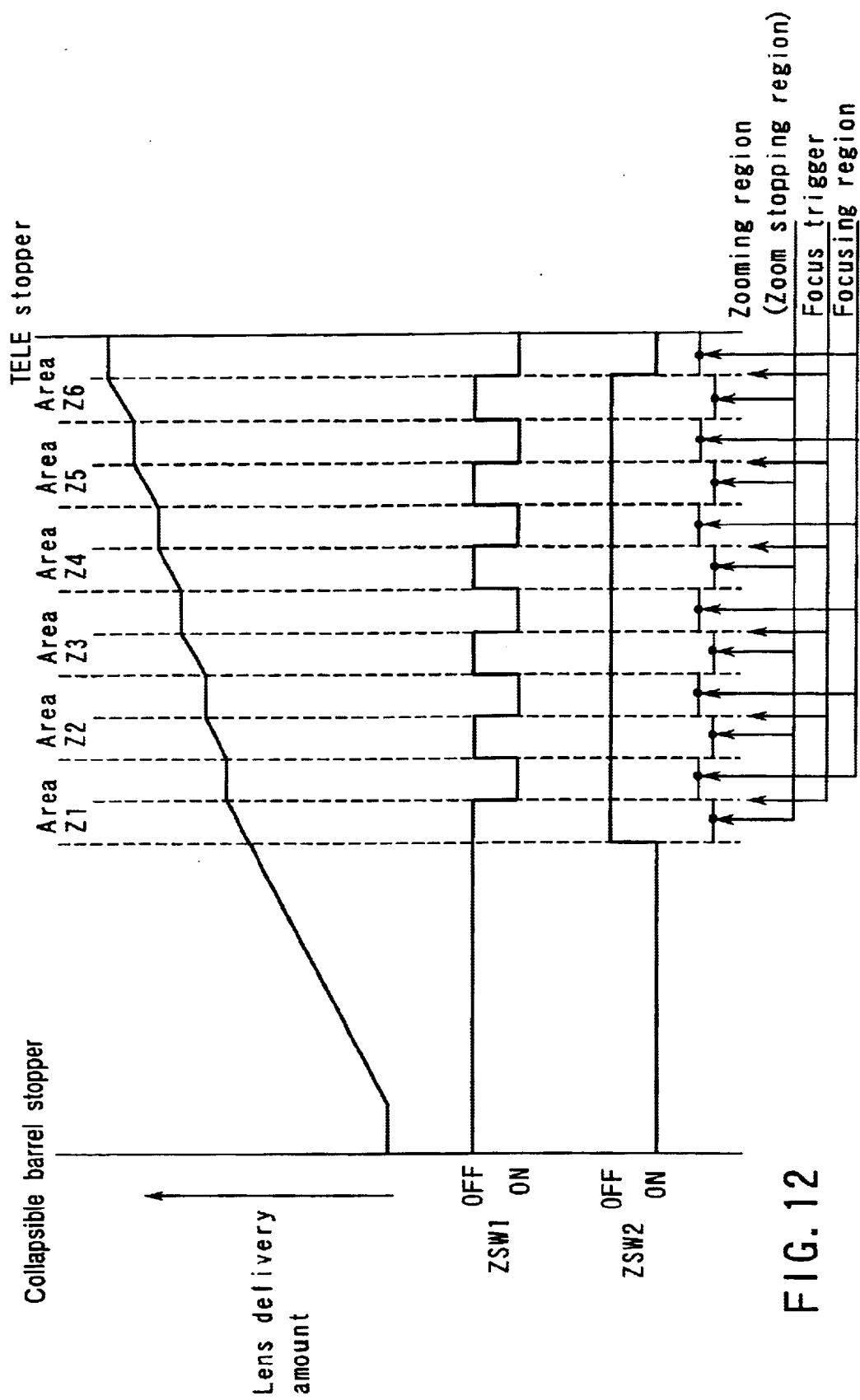
FIG. 12 is a graph showing a relation between a rotation angle of a rotary frame and a pattern of an encoder for explaining a zoom lens position control device according to a second embodiment.

FIG. 12 is a graph showing a relation between the lens delivery amount of the second lens group 4 followed by the rotation of the rotary frame 5 and an output pattern of the encoder 13.

The zoom lens according to the present embodiment is a step zoom lens constituted in such a manner that the focal length changing region (zooming region) and the focal point adjusting region (focusing region) are alternately repeated. The step zoom lens has six zoom steps of areas Z1 to Z6. The left portion of the graph denotes the direction in which the lens is retracted so as to be in the collapsible barrel state and the right portion thereof denotes the direction in which the lens is delivered toward the telephoto end.

The left end indicates a mechanical stopper position, at which the lens frames are further retracted over the collapsible barrel state in which the lens frames are received in the camera body. The right end denotes a mechanical stopper position with which the lens frame is come into contact at the telephoto end.

The encoder 13 in the present embodiment includes two kinds of output patterns of a ZSW1 and a ZSW2. The output ZSW2 is realized by increasing the encoding pattern 11 of the encoder 13 by one.

ZSW1 is in the OFF state from the collapsible barrel stopper to the start position of the focal point adjusting region at the wide angle end (area Z1). After that, the ON state and the OFF state are repeated as a pattern. The focal length is changed in the area where ZSW1 is in the OFF state. The focal point is adjusted in the area where ZSW1 is in the ON state. Accordingly, the exposure is performed in the area where ZSW1 is in the ON state. The zooming operation of the zoom lens is controlled so that the zoom lens is stopped in the area where ZSW1 is in the OFF state. The focusing operation is controlled in the area where ZSW1 is in the ON state by using a point, at which ZSW1 is shifted from the OFF state to the ON state, as a reference (focus trigger).

On the other hand, ZSW2 is in the ON state from the collapsible barrel stopper to the start position of the wide angle end (area Z1). ZSW2 is set in such a manner that it is in the OFF state after the above position to the start position of the focal point adjusting region at the telephoto end (area Z6) and it is in the ON state from the focal point adjusting area at the telephoto end to the telephoto stopper.

Figure 13:
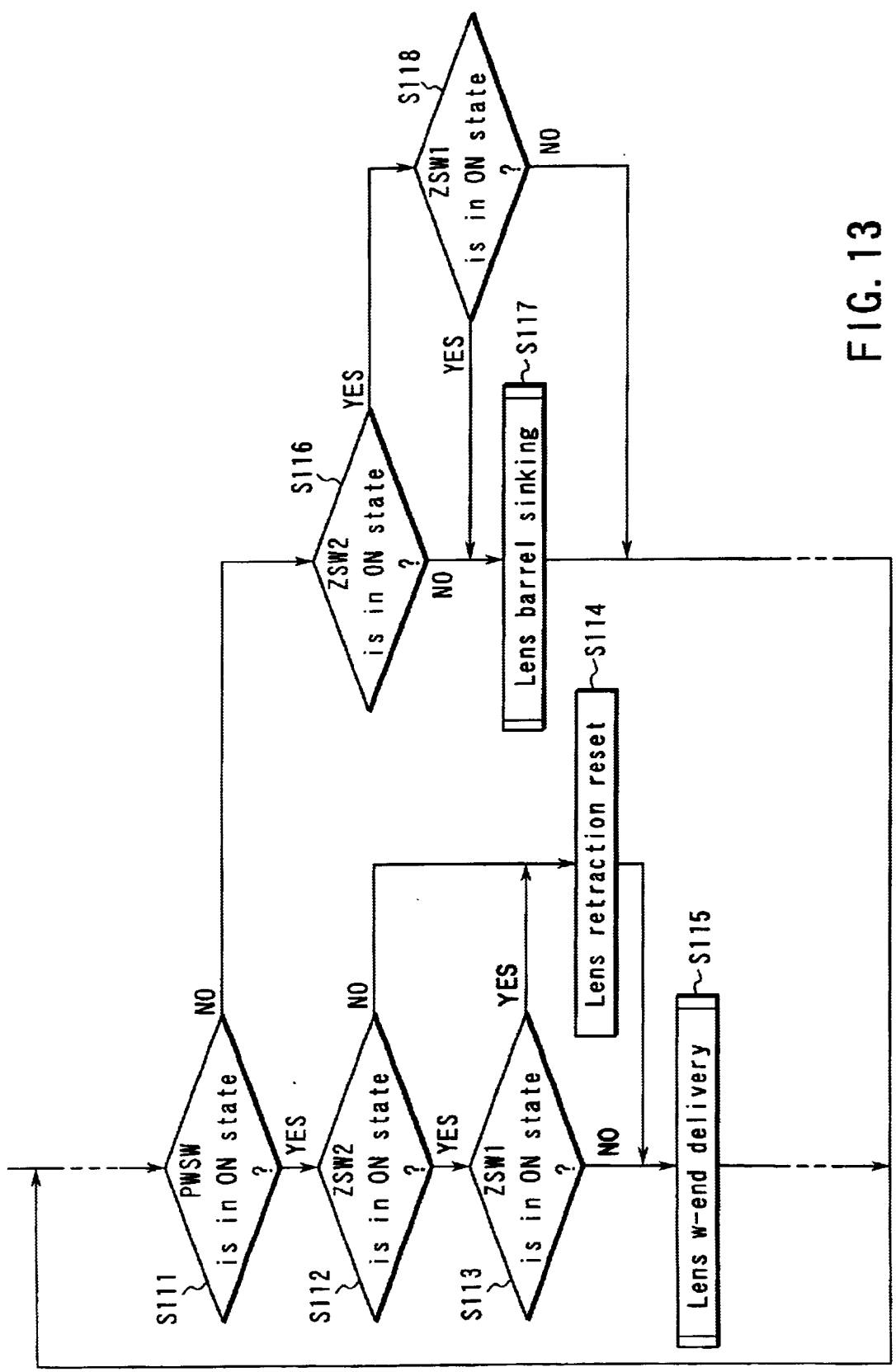

The zooming operation and the focusing operation of the camera according to the present embodiment will now be described with reference to a flowchart. FIG. 13 relates to a processing when a power battery of a camera according to the second embodiment is turned on and shows a flowchart for explaining the characterized portion alone.

First, whether the power switch (PWSW) 20 of the camera is in the ON state is determined (step S111). If PWSW 20 is in the ON state (YES), the processing is executed in the power-ON state. Whether ZSW2 is in the ON state is then determined (step S112). In this instance, if ZSW2 is in the ON state (YES), it is determined that the zoom lens is set in the collapsible barrel region or the focal point adjusting region (focusing region in the area Z6) at the telephoto end. Then, whether ZSW1 is in the ON state is determined (step S113). On the other hand, if ZSW2 is in the OFF state (NO), it is determined that the zoom lens is set in the zooming region. The zoom lens is temporarily retracted to the reference position at the wide angle end (step S114). As will be described hereinafter, it is unnecessary to retract the lens to the collapsible barrel position.

In the determination in the foregoing step S113, if ZSW1 is in the ON state (YES), it is determined that the zoom lens is located in the focal point adjusting region the telephoto end. Then, the processing routine is shifted to the foregoing step S114 to retract the zoom lens to the reference position at the wide angle end. On the other hand, if ZSW1 is in the OFF state (NO), since the zoom lens is located in the collapsible barrel region or at the reference position at the wide angle end (and it is in the power-ON state), the zoom lens is delivered at the wide angle end (step S115) to be in a photographable state as will be explained hereinbelow.

In the determination in the foregoing step S111, if the PWSW 20 is in the OFF state (NO), whether ZSW2 is in the ON state is determined (step S116). In the determination, when ZSW2 is in the OFF state (NO), the zoom lens is located at a position in the zooming region. To perform a power-off processing as will be described hereinafter, the zoom lens barrel is sunk (step S117) and the processing routine is then returned to the foregoing step S111. On the other hand, if ZSW2 is in the ON state (YES), whether ZSW1 is in the ON state is determined (step S118). In the determination, if ZSW1 is in the ON state (YES), it is determined that the lens is located at a position in the zooming region. To perform the power-off processing as will be described hereinafter, the processing routine is shifted to step S117 to sink the zoom lens barrel and the processing routine is then returned to the foregoing step S111.

Figure 14:
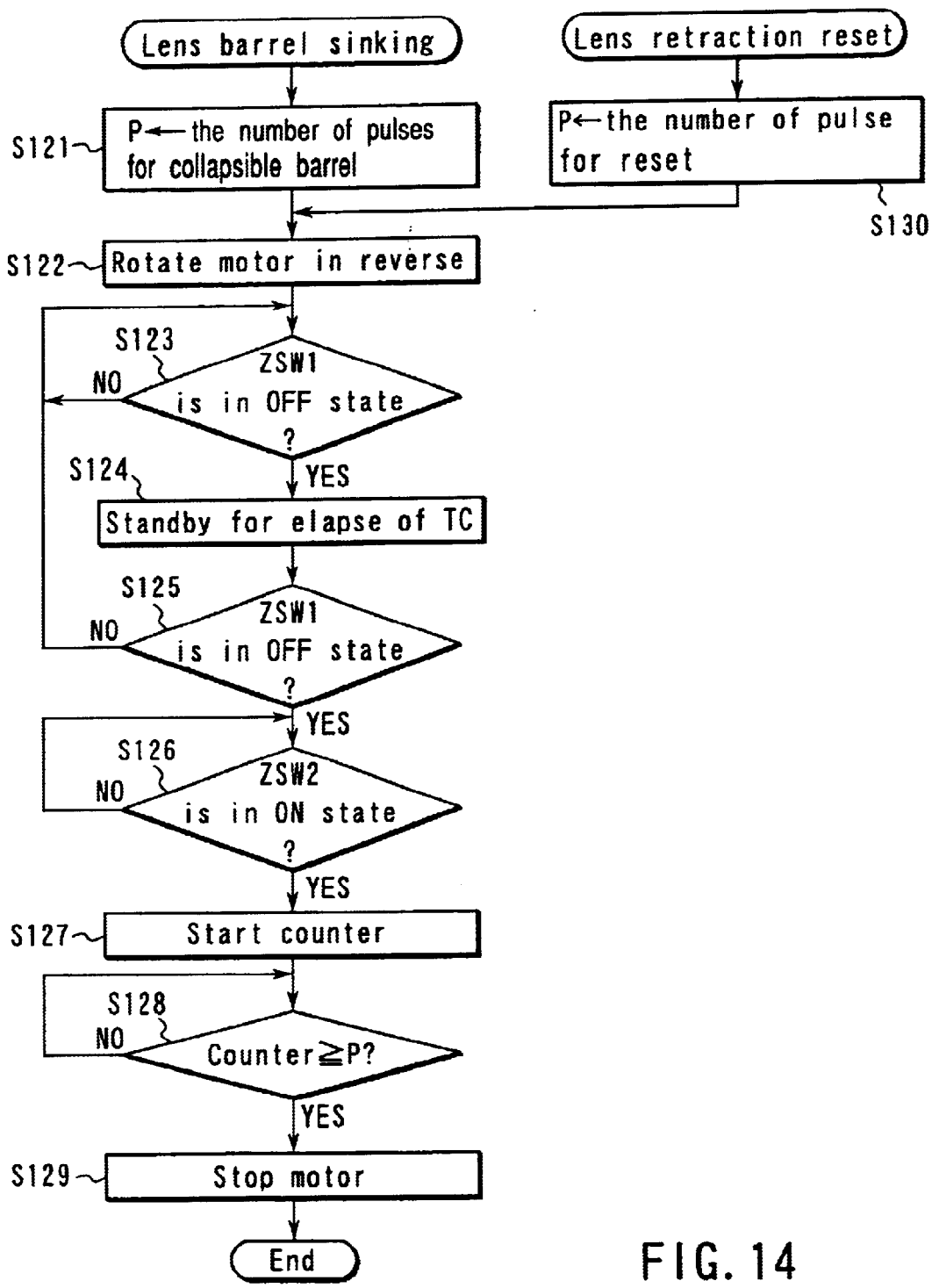
FIG. 14 is a flowchart for explaining subroutines of the lens retraction reset operation and the lens collapsible barrel operation explained in FIG. 13.

Subroutines of the lens retraction reset operation in step S114 explained in FIG. 13 and subroutines of the lens collapsible barrel operation in step S117 will now be described with reference to a flowchart shown in FIG. 14.

First, the number of pulses P for collapsible barrel is set to the RAM in the control circuit 16 (step S121). In this instance, the number of pulses for collapsible barrel denotes the number of pulses of the PI 15 for a period during which the rotary frame 5 is rotated from a point on the collapsible barrel side at the wide angle end (area Z1), where ZSW2 is switched from the OFF state to the ON state, to the collapsible barrel position located just before the collapsible barrel stopper. The value has been previously stored in the non-volatile memory 19. Subsequently, driving of the motor 7 reverse is started, namely, the retraction is started (step S122).

Whether ZSW1 is in the OFF state is determined (step S123). If it is in the ON state (NO), standby is held until ZSW1 enters the OFF state. If it is in the OFF state (YES), at that time, even when the initial position is located in the focal point adjusting region at the telephoto end, it can be determined that the zoom lens is surely shifted to the focal point adjusting region at the telephoto end. Standby is held until time TC is elapsed (step S124), whether ZSW1 is in the OFF state is again determined (step S125). In this instance, if ZSW1 is in the ON state (NO), the processing routine is returned to step S123 and the same processing is again repeated. On the other hand, if ZSW1 is in the OFF state (YES), it can be determined that the OFF sate of ZSW1 is determined, namely, the lens is surely moved in the focal point adjusting region at the telephoto end. The processing routine is shifted to the next step S126.

In this instance, whether ZSW2 is in the ON state is determined (step S126). In the determination, if it is in the OFF state (NO), standby is held until ZSW2 enters the ON state. On the other hand, if it is in the ON state, the counter to count the pulse signals of the PI 15 is started (step S127). Whether the counted number of pulses of the PI 15 reaches the number of pulses P for collapsible barrel (the number of pulses for reset) (step S128). If it does not reach the number P (NO), standby is held until it reaches the number P. On the other hand, if it reaches the number P (YES), the motor 7 is stopped (step S129) to finish the collapsible barrel operation.

As to the lens retraction reset operation, first, the number of pulses for reset is set to P and is then set to the RAM in the control circuit 16 (step S130). In this instance, the number of pulses for reset denotes the number of pulses of the PI 15 generated for a period during which the rotary frame 5 is rotated from the point on the collapsible barrel side at the wide angle end (area Z1), where ZSW2 is switched from the OFF state to the ON state, to a position where the rotary frame is retracted by a predetermined amount. The value has been previously stored in the non-volatile memory 19. As the subsequent sequence, the processing routine is shifted to the foregoing step S122 and the processing up to the foregoing step S129 is performed.

As the result of the lens collapsible barrel operation, the lens is stopped at the collapsible barrel position located just before the barrel-sinking stopper. As the result of the lens retraction reset operation, the lens is stopped at the position where the lens is slightly retracted over the wide angle end on the collapsible barrel side.

Figure 15:
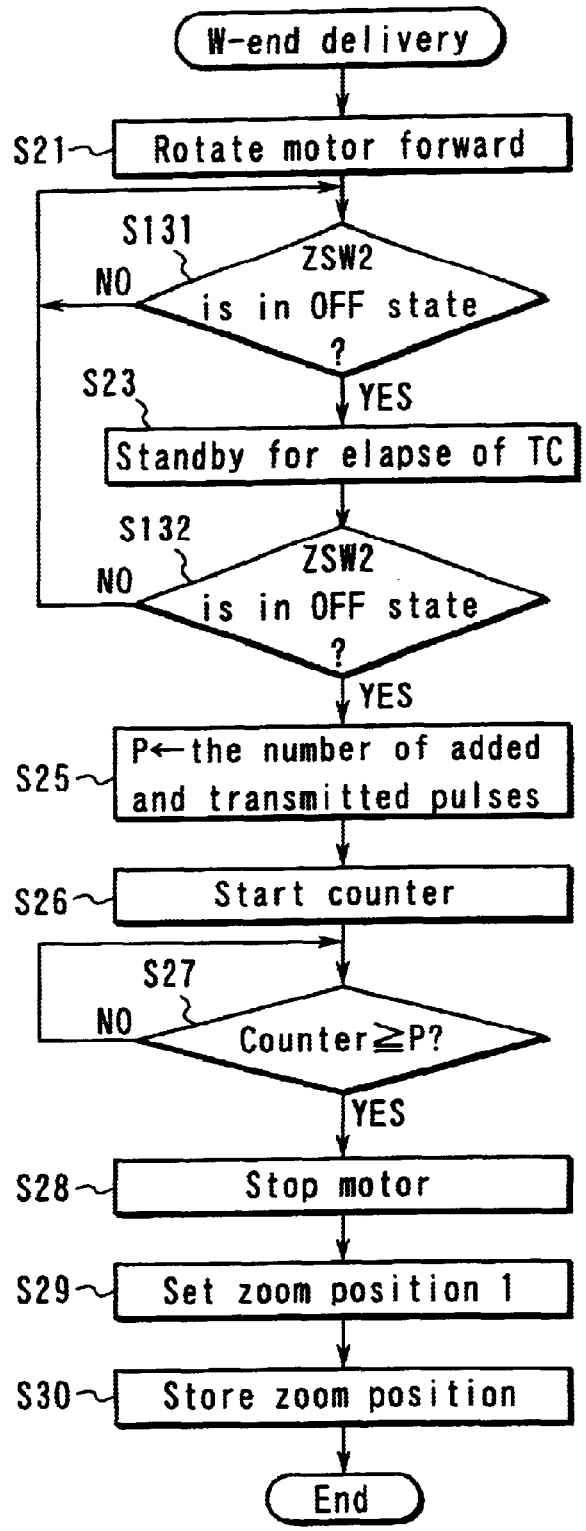
FIG. 15 is a flowchart for explaining subroutines of the wide-end delivery operation of the camera shown in FIG. 13.

Subsequently, subroutines of the wide-end delivery operation of the camera in step S115 shown in FIG. 13 will now be described with reference to a flowchart shown in FIG. 15. In this instance, the initial position of the zoom lens is the collapsible barrel position or the position, where the lens is slightly retracted over the wide angle end, as the result in step S114 in FIG. 13. The delivery operation is remarkably similar to the sequence of the wide-end delivery operation described in FIG. 5 in the foregoing first embodiment. The same step reference numerals designate the same step processings to simplify the description.

First, the zoom lens is delivered by rotating the motor 7 forward (step S21). Whether ZSW2 is in the OFF state is determined (step S131). In the determination, if it is in the ON state (NO), standby is held until ZSW2 enters the OFF state. When it is in the OFF state (YES), standby is held until the time TC is elapsed (step S23). After that, whether ZSW2 is in the OFF state is again determined (step S132). In the determination, if ZSW2 is in the ON state (NO), the processing routine is returned to step S131. If it is in the OFF state (YES), the number of added and transmitted pulses is set to P and is then set to the table of the RAM in the control circuit 16. Although the stopping position at the wide angle end (area Z1) is set to the position where the OFF state of ZSW1 is determined in the first embodiment, according to the present embodiment, the stopping position at the wide angle end is set to the position where the OFF state of ZSW2 is determined. As for the processing of the zooming operation (zoom driving) and the processing of the exposure operation (release processing), the same processings as those in the first embodiment can be performed (refer to FIGS. 7, 8, and 10). Subsequently, the counter to count the number of PI pulses is started. When the counted number of PI pulses reaches the predetermined number of added and transmitted pulses P, the motor 7 is stopped. The fact that the zoom position is located in the area Z1 is set to the table of the RAM in the control circuit 16 and is also stored to the non-volatile memory 19 to finish the processing (step S26 to S30).

According to the second embodiment mentioned above, in addition to the advantages of the foregoing first embodiment, the step zoom lens, which can set a plurality of focal lengths, can be controlled by the encoding patterns whose number is small. Irrespective of the stopping position of the zoom lens, the zoom position can be initialized for the minimum time, so that time lag generated until the lens is shifted to the photographable state can be reduced.

A third embodiment will now be described.

Figure 16:
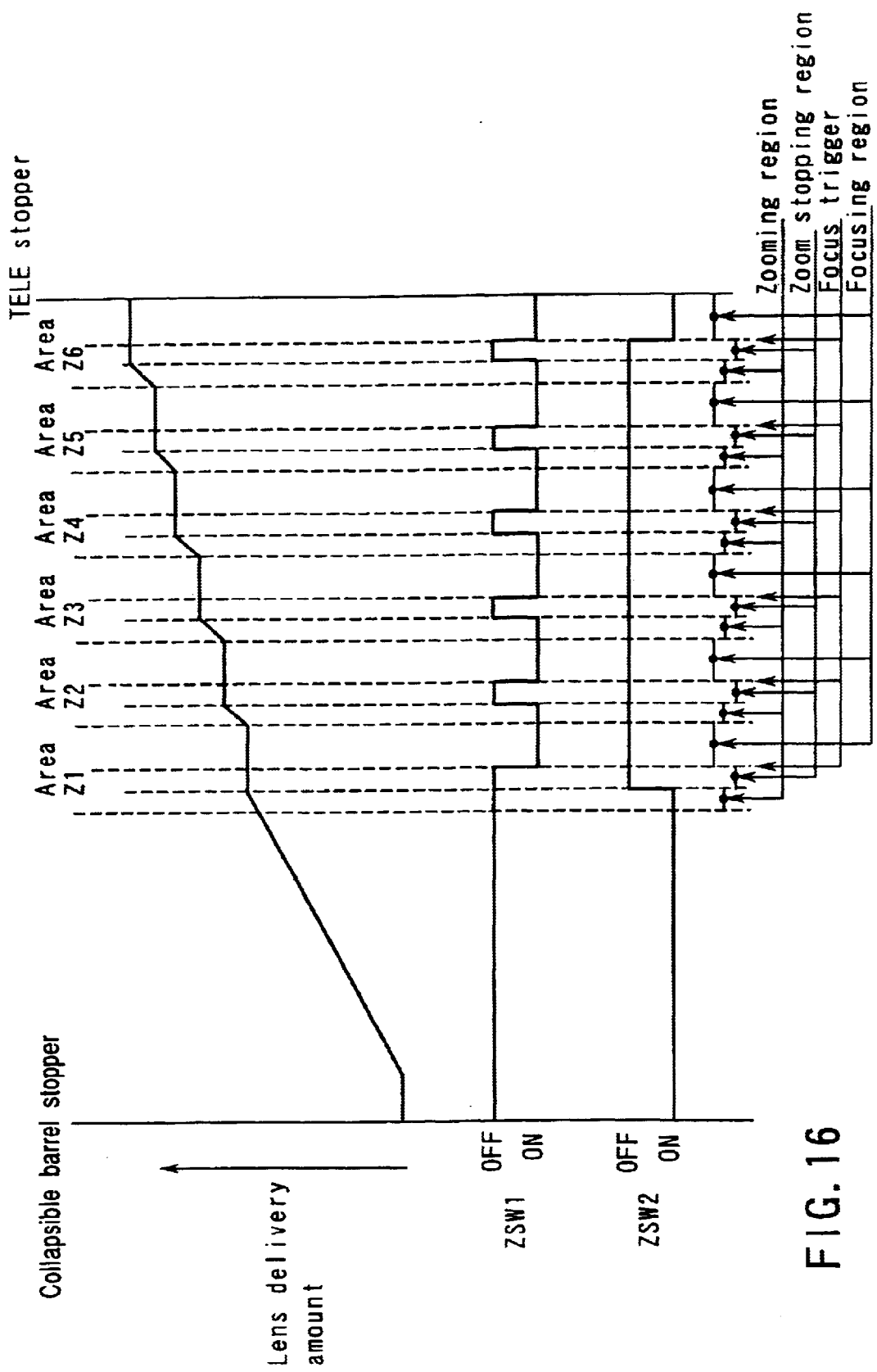
FIG. 16 is a graph showing a relation between a rotation angle of a rotary frame and a pattern of an encoder for explaining a zoom lens position control device according to a third embodiment.

FIG. 16 is a graph showing a relation between the lens delivery amount of the second lens group 4 followed by the rotation of the rotary frame 5 and an output pattern of the encoder 13.

A zoom lens in a camera according to the present embodiment is a step zoom lens constituted in such a manner that a focal length changing region and a focal point adjusting region are alternately repeated. In this instance, the zoom lens has six zoom steps of areas Z1 to Z6. The left portion of the graph denotes the retraction direction of the zoom lens and the right portion of the graph denotes the delivery direction. The left end denotes a mechanical stopper position where the lens frames are further retracted over the collapsible barrel position, where the lens frames are received in the camera body. The right end denotes a mechanical stopper position with which the zoom lens is come into contact at the telephoto end.

The above areas Z1 to Z6 are divided into three regions of the zooming region where both of the first lens frame 2 and the second lens frame 4 are driven to perform the zooming operation, the zoom stopping region as an actual stopping position of the lens frames, and the focusing region where the first lens frame 2 alone is driven to perform the focusing operation.

An output pattern of the encoder 13 includes two kinds of output patterns of ZSW1 and ZSW2.

The ZSW1 is in the OFF state from the collapsible barrel stopper to the start position in the focal point adjusting region at the wide angle end (area Z1). After the position, the ON state and the OFF state are repeated by turns. The zooming operation is controlled so that the zoom lens is stopped in the area where the ZSW1 is in the OFF state.

The focusing operation is controlled in the area where ZSW1 is in the ON state by using a point at which ZSW1 is switched from the OFF state to the ON state as a reference (focus trigger).

On the other hand, ZSW2 is set so that it denotes the ON state from the collapsible barrel stopper to a position at which the lens is delivered from the start position at the wide angle end (area Z1) by a predetermined amount, it denotes the OFF state from the above position to the start position of the focal point adjusting region at the telephoto end (area Z6), and it denotes the ON state from the focal point adjusting region at the telephoto end to the telephoto stopper. As for the operations such as zooming and focusing, the same processings as those in the foregoing second embodiment can be used in general.

According to the above embodiment, in addition to the advantages of the foregoing second embodiment, the zoom stopping region is limited narrowly. Consequently, in a camera having a finder lens which can vary a focal length in synchronization with the zooming operation of a photographic lens, irrespective of zoom-up and zoom-back, variations of a finder image, which is obtained when the lens is stopped in the same region, can be further reduced.

Moreover, since the zoom stopping region is limited narrowly, a lens entrance region upon photographing can be set to a short length. Consequently, release time lag can be further reduced.

A fourth embodiment will now be described.

Figure 17:
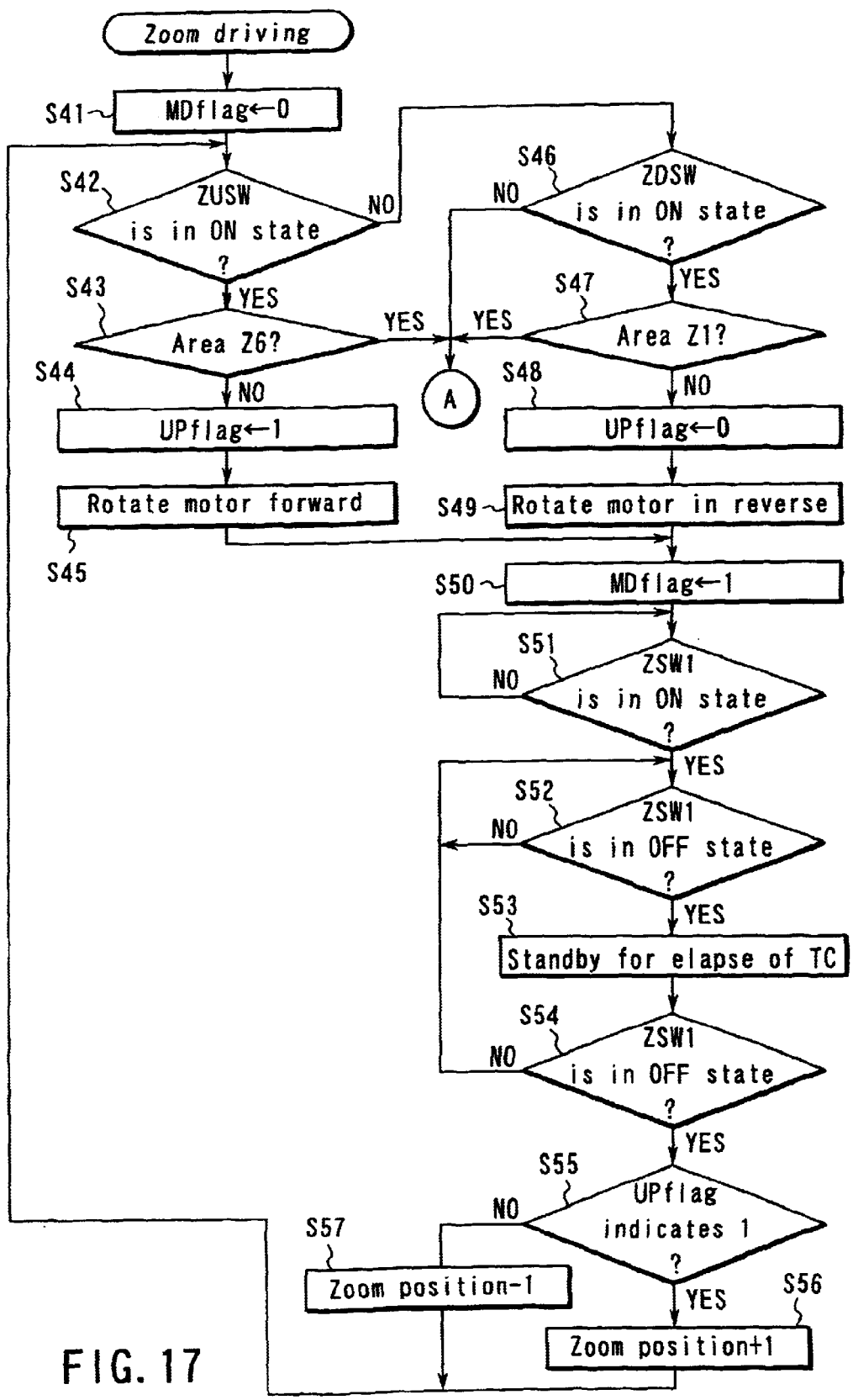
FIG. 17 is the former half portion of a flowchart for explaining a fourth embodiment.
Figure 18:
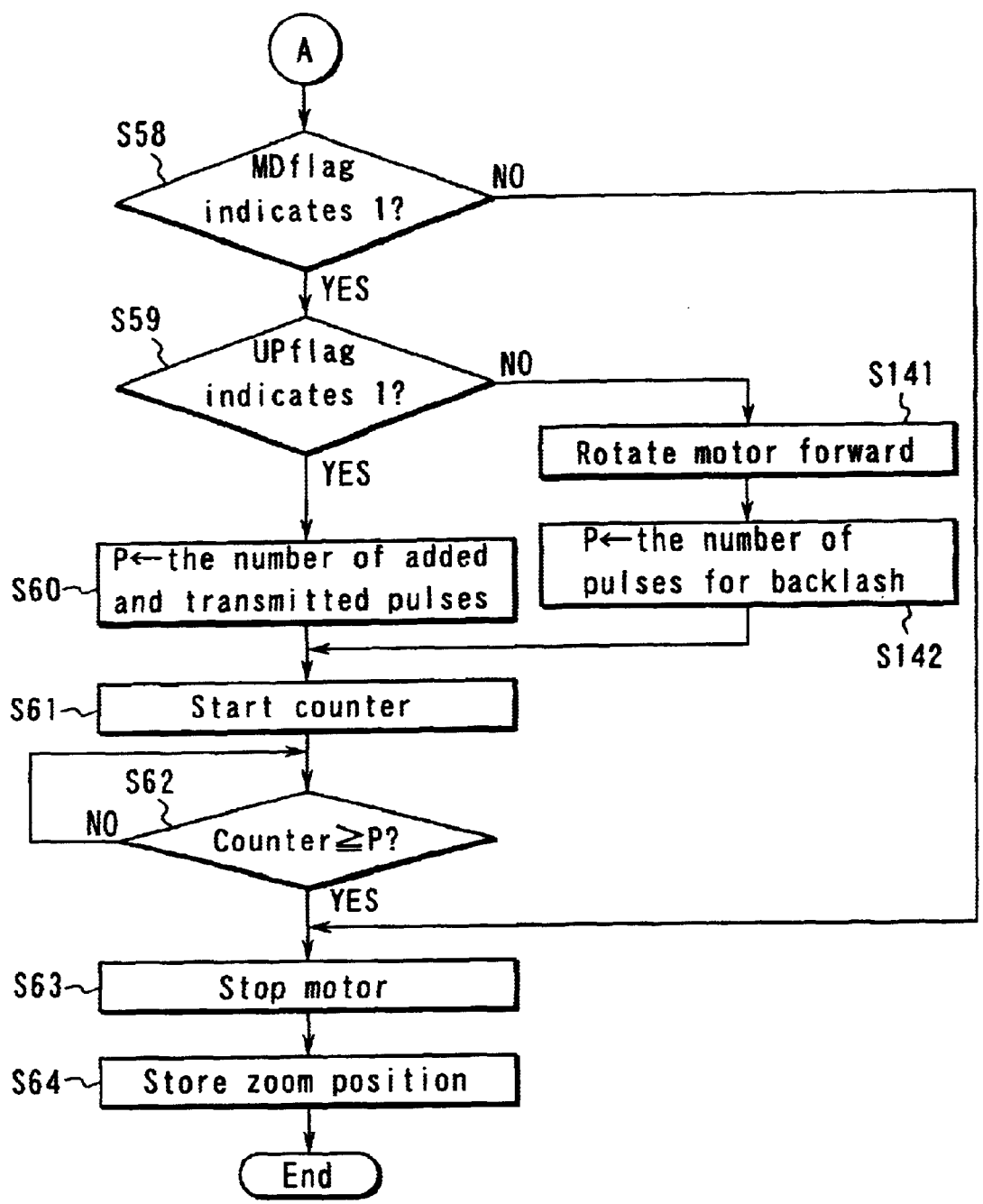
FIG. 18 is the latter half portion of the flowchart for explaining the processing according to the fourth embodiment, the flowchart following FIG. 17.

A processing of the zooming operation (zoom driving) will now be explained with reference to flowcharts shown in FIGS. 17 and 18. In this instance, the flowcharts of the present embodiment are similar to the foregoing flowcharts shown in FIGS. 7 and 8. The same step reference numerals designate the same step processings to simplify the description.

First, the MD flag indicating that the motor 7 is being driven is cleared. In the case where ZUSW 22 is in the ON state, when the lens does not reach the telephoto end (area Z6), the UP flag set in the RAM in the control circuit 16 is set to "1" to store the fact that the zoom-up operation is being performed. The motor 7 is rotated forward to start the delivery of the zoom lens (steps S41 to S45).

In the case where the ZUSW 22 is in the OFF state, when the ZDSW 23 is in the ON state and the zoom lens does not yet reach the wide angle end (area Z1), the UP flag set in the RAM is cleared to store the fact that the zoom-back operation is being performed. The motor 7 is rotated reverse to start the retraction of the zoom lens (steps S46 to S49).

Subsequently, "1" is set to the MD flag indicating that the motor 7 is being driven. It is confirmed that the zoom lens is moved from the zoom stopping region to the focal point adjusting region and ZSW1 denotes the ON state. After that, when ZSW1 enters the OFF state, standby is held for time TC. After the OFF state is determined, the UP flag is confirmed. In this instance, when it can be determined that "1" is set and the zoom lens is being in the zoom-up operation, zoom positional information set in the RAM is updated on the telephoto side by one step. On the other hand, when it can be determined that "0" is set to the UP flag and the zoom lens is being in the zoom-back operation, the zoom positional information set in the RAM is updated on the wide angle side by one step. The processing routine is returned to step S42 (steps S50 to 56).

When the zoom lens reaches the telephoto end in the foregoing step S43, when it reaches the wide angle end in the foregoing step S47, or when the operation of a zoom lever is finished in the foregoing step S46, it is determined that "1" is set to the MD flag. After that, whether the motor 7 for performing the stop processing is being driven is determined (step S58). In the determination, when the MD flag denotes "1" (YES), the motor 7 is being driven. Whether "1" is set to the UP flag is determined (step S59) to determine the driving direction. On the other hand, when the MD flag denotes "0" in step S58, the processing routine is shifted to step S63, which will be described hereinbelow.

If "1" is set to the UP flag (YES), the predetermined number of added and transmitted pulses is set to P (step S60). On the other hand, when the Up flag denotes "0", namely, when the retraction is performed, the motor 7 is rotated forward in the delivery direction (step S141), the number of pulses for backlash is set to P (step S142), and the processing routine is shifted to the next step S61. In this instance, the number of pulses for backlash denotes the number of pulses of the PI 15 generated for a period during reducing backlash of the gear train between the motor 7 and the rotary frame 5. The number has been previously stored in the non-volatile memory 19. Since the motor 7 is driven as many as the number of pulses set at that time in steps S61 and S62, which will be described hereinafter, the backlash of the gear train is reduced. It is assumed that the number of pulses has some allowance so that the rotary frame 5 is not rotated in the reverse direction.

Subsequently, when the number of added and transmitted pulses P is set in the foregoing step S60, or when the number of backlash pulses P is set in the foregoing step S142, the counter is started, thereby starting to count the number of PI pulses (step S61). Whether the counted number of PI pulses reaches the number of added and transmitted pulses P or the number of backlash pulses P is determined (step S62). In the determination, if the number of PI pulses reaches the number of added and transmitted pulses P or the number of backlash pulses P, it is determined that the zoom lens reaches a position where it should be stopped. The motor 7 is then stopped and zoom positional information is stored to the non-volatile memory 19 (steps S63 and S64).

As mentioned above, according to the present embodiment, mechanical looseness is always reduced on the delivery side at the zoom stop time, time lag in the delivery for the focal point adjustment at the next photographing time can be suppressed. Moreover, the lens is smoothly moved in the zooming operation without unnatural motion.

As mentioned above, in the case where the stopping position of the zoom lens is initialized and, after that, the exposure operation is not performed, the user may be confused. Accordingly, a warning can be given by using, for example, a display portion or a sound generating portion provided in the finder.

When the exposure is performed subsequent to the initialization, time required before the exposure, namely, release time lag becomes longer. Accordingly, the stopping position of the zoom lens can be initialized at timing that is different from and earlier than that of the release operation. For example, in a case where an input of ZSW1 to the control circuit is allocated to a port, in which an interruption processing can be performed, and a change in the state of ZSW1 is detected in the operation other than the zooming and focusing operations, it is determined that an external force is applied to the lens frames. The initialization operation regarding the stopping position of the zoom lens can be immediately executed. For instance, the state of the ZSW1 is detected each time an operation member such as a zoom lever other than a release button is operated. When it is determined that the stopping position of the zoom lens may be shifted, the stopping position of the zoom lens can be initialized.

As mentioned above in detail, according to the present invention, there can be provided the zoom lens position control device in which the position of the step zoom with high accuracy is detected with the simple constitution and the zooming operation and the focal point adjustment are performed appropriately.

According to the zoom lens position control device of the present invention, even when the stopping position of the zoom lens is moved due to the application of an external force, the zoom lens can be subsequently shifted from the appropriate focal length position to the exposure operation. Focusing control with high accuracy can be realized with a simple constitution.

What is claimed is:

1. A zoom lens position control device comprising:
   a zoom lens having a plurality of zoom steps in which a plurality of steps each comprising a focal length changing region and a focal point adjusting region are continuously arranged;
   driving means for driving the zoom lens;
   switching means in which the ON/OFF state is changed due to a shift between the focal length changing region and the focal point adjusting region;
   detecting means for detecting the ON/OFF state of the switching means;
   control means for stopping driving the zoom lens in accordance with the detection of a change in the state of the switching means through the detecting means; and
   initializing means for driving a stopping position of the zoom lens to an initial position in accordance with the detection result of the state of the switching means before focal point adjustment,
   wherein the initializing means detects the state of the switching means when the zoom lens is stopped and, when the state is changed, moves the stopping position of the zoom lens to the initial position.

2. A zoom lens position control device comprising:
   a zoom lens having a plurality of zoom steps in which a plurality of steps each comprising a focal length changing region and a focal point adjusting region are continuously arranged;
   driving means for driving the zoom lens;
   switching means in which the ON/OFF state is changed due to a shift between the focal length changing region and the focal point adjusting region;
   detecting means for detecting the ON/OFF state of the switching means; and
   control means for stopping driving the zoom lens in accordance with the detection of a change in the state of the switching means through the detecting means,
   wherein the control means shifts offset in accordance with the zoom driving direction after the detecting means detects a change in the state of the switching means until the zoom driving of the zoom lens is stopped.

3. The device according to claim 2, wherein the offset has a large value when the zoom driving is performed in the same direction as the focal point adjusting direction.

4. A zoom lens position control device comprising:
   a zoom lens which has a lens group that is movable along an optical axis and which can successively change a focal length by moving the lens group through a plurality of zoom steps in which zoom steps each comprising a focal length changing region and a focal point adjusting region are continuously arranged;
   a driving mechanism which performs zoom driving to vary a focal length along the zoom steps of the zoom lens;
   a pattern which is provided on a movable lens barrel of the zoom lens in order to show a shift between the focal length changing region and the focal point adjusting region;
   a detecting section which detects that the focal length changing region is in the ON state and the focal point adjusting region is in the OFF state in the shift between the focal length changing region and the focal point adjusting region on the basis of the detection of the pattern;
   a stopping circuit which stops driving the zoom lens in the ON state based on the shift of the pattern detected by the detecting section;
   a memory which stores a position where the zoom lens stops; and
   a control circuit which moves the zoom lens to an initial position when the zoom lens is moved from the stopping position stored in the memory.

5. The device according to claim 4, wherein the control circuit confirms the presence or absence of the movement of the zoom lens prior to the focal point adjustment operation.

6. The device according to claim 4, wherein the control circuit executes the confirmation of the presence or absence of the movement of the zoom lens at any time.

7. The device according to claim 4, wherein the pattern is an encoding pattern, which is formed on a movable lens barrel in the zoom lens, to discriminate between the focal length changing region and the focal point adjusting region on the basis of patterning of a conductor, and the detecting section is a conductive brush which is brought into contact with the encoding pattern to form the ON/OFF state on the basis of electrical conduction/non-conduction, thereby detecting the shift between the focal length changing region and the focal point adjusting region.

8. A zoom lens position control device comprising:
   a zoom lens which has a lens group that is movable along an optical axis and which moves the lens group through a plurality of zoom steps, in which zoom steps each comprising a focal length changing region and a focal point adjusting region are continuously arranged, so that a focal length can be successively changed;
   a driving mechanism which performs zoom driving for changing a focal length along the zoom steps of the zoom lens;
   a pattern which is formed on a movable lens barrel of the zoom lens so as to show a shift between the focal length changing region and the focal point adjusting region;
   a detecting section which detects the pattern to detect the shift between the focal length changing region and the focal point adjusting region as an ON/OFF state; and a control circuit which stops a change of the focal length of the zoom lens in accordance with the ON/OFF state detected by the detecting section, wherein the pattern is an encoding pattern, which is formed on the movable lens barrel in the zoom lens, to discriminate between the focal length changing region and the focal point adjusting region on the basis of patterning of a conductor, wherein the detecting section is a conductive brush which is come into contact with the encoding pattern to form the ON/OFF state on the basis of electrical conduction/non-conduction, thereby detecting the shift between the focal length changing region and the focal point adjusting region, and wherein, at non-conduction time, in a case where a non-conductive state is generated, predetermined chattering absorption time is elapsed, and after that, it is in a non-conductive state, the detecting section generates an output indicative of the OFF state.

9. A camera including:

a step zoom driving mechanism in which regions, where a focal length is varied, and regions, where focal point adjustment is performed, are alternately arranged, and which moves a photographic lens so that the photographic lens is located in the regions by turns, said step zoom driving mechanism including:
 (a) a movable lens frame,
 (b) a motor which drives the movable lend frame, and an encoder which detects a displacement state of the movable lens frame, said encoder generating different kinds of signals in the focal length changing region and the focal point adjusting region; and a controller which controls the motor on the basis of the signal generated from the encoder to instruct the focal length changing operation and the focal point adjustment operation, wherein the encoder directly detects the displacement state of the movable lens frame, wherein the encoder includes a conductive pattern portion formed on the movable lens frame and a conductive brush which is come into contact with the conductive pattern portion, and wherein in the encoder, the conductive pattern portion and the conductive brush enter a non-conductive state in the focal length changing region and the conductive pattern portion and the conductive brush enter a conductive state in the focal point adjusting region.

10. The camera according to claim 9, wherein the step zoom driving mechanism further includes a mechanism which moves the photographic lens to a collapsible barrel position where the lens is retracted in a camera body, and in the encoder, the conductive pattern portion and the conductive brush enter the non-conductive state in the focal length changing region and the conductive pattern portion and the conductive brush enter the conductive state in a collapsible barrel region and the focal point adjusting region.

11. The camera according to claim 9, wherein the controller instructs to stop the focal length changing operation after a predetermined elapse of time subsequent to timing when the output of the encoder is changed from the conductive state to the non-conductive state.

12. The camera according to claim 9, wherein the controller sets timing when the output of the encoder is changed from the conductive state to the nonconductive state to a reference position of the focal point adjustment operation.

13. A camera including:

a step zoom driving mechanism in which regions, where a focal length is varied, and regions, where focal point adjustment is performed, are alternately arranged, and which moves a photographic lens so that the photographic lens is located in the regions by turns, said step zoom driving mechanism including:
 (a) a movable lens frame,
 (b) a motor which drives the movable lend frame, and an encoder which detects a displacement state of the movable lens frame, said encoder generating different kinds of signals in the focal length changing region and the focal point adjusting region; and a controller which controls the motor on the basis of the signal generated from the encoder to instruct the focal length changing operation and the focal point adjustment operation, wherein the controller controls the motor on the basis of the output signal of the encoder before the focal point adjustment operation, and wherein the controller executes the initialization of the photographic lens when the output signal of the encoder is not a desired signal.

14. The camera according to claim 13, wherein the step zoom driving mechanism further includes a mechanism which moves the photographic lens to a collapsible barrel position where the lens is retracted in a camera body, and the initialization of the photographic lens includes the retraction operation of the photographic lens to the collapsible barrel position and the delivery operation performed thereafter.

15. The camera according to claim 13, wherein the initialization of the photographic lens includes the retraction operation of the photographic lens in the vicinity of the widest angle end.

16. The camera according to claim 13, further including;

a memory which stores the displacement state of the movable lens frame after the focal length changing operation, wherein the controller compares the state with information recorded in the memory to determine whether it is a desired signal.

* * * * *